(12) United States Patent
Simard et al.

(10) Patent No.: US 7,983,200 B2
(45) Date of Patent: *Jul. 19, 2011

(54) APPARATUS AND METHOD FOR PACKET-BASED MEDIA COMMUNICATIONS

(75) Inventors: Frederic F. Simard, Nepean (CA); David R. Cuddy, Ottawa (CA); Philip K. Edholm, Pleasanton, CA (US)

(73) Assignee: Nortel Networks Limited, Mississauga, Ontario (CA)

( * ) Notice: Subject to any disclaimer, the term of this patent is extended or adjusted under 35 U.S.C. 154(b) by 1763 days.

This patent is subject to a terminal disclaimer.

(21) Appl. No.: 11/113,050

(22) Filed: Apr. 25, 2005
(Under 37 CFR 1.47)

(65) Prior Publication Data

US 2005/0185602 A1   Aug. 25, 2005

Related U.S. Application Data

(63) Continuation of application No. 09/750,015, filed on Dec. 29, 2000, now Pat. No. 6,956,828.

(51) Int. Cl.
*H04L 12/16* (2006.01)
(52) U.S. Cl. ............ 370/260; 379/158; 379/202.01
(58) Field of Classification Search .................. None
See application file for complete search history.

(56) References Cited

U.S. PATENT DOCUMENTS

| | | | |
|---|---|---|---|
| 3,912,874 A | 10/1975 | Botterell et al. | 179/18 BC |
| 3,937,898 A | 2/1976 | Presto et al. | 179/18 BC |
| 4,507,781 A | 3/1985 | Alvarez, III et al. | 370/104 |
| 4,685,425 A | 8/1987 | Eising | 122/17 |
| 4,920,565 A | 4/1990 | Strawczynski et al. | 380/6 |
| 5,020,098 A | 5/1991 | Celli | 379/202 |
| 5,317,567 A | 5/1994 | Champion | 370/62 |
| 5,818,836 A | 10/1998 | DuVal | 370/389 |
| 5,983,192 A * | 11/1999 | Botzko et al. | 704/500 |
| 5,991,385 A | 11/1999 | Dunn et al. | 379/202 |
| 6,081,513 A | 6/2000 | Roy | 370/260 |
| 6,141,597 A | 10/2000 | Botzko et al. | 700/94 |
| 6,157,635 A | 12/2000 | Wang et al. | 370/352 |
| 6,330,022 B1 * | 12/2001 | Seligmann | 348/14.08 |
| 6,463,414 B1 | 10/2002 | Su et al. | 704/270.1 |
| 6,466,550 B1 | 10/2002 | Foster et al. | 370/261 |
| 6,522,633 B1 * | 2/2003 | Strawczynski | 370/260 |
| 6,577,622 B1 | 6/2003 | Schuster et al. | 370/352 |

(Continued)

*Primary Examiner* — Phirin Sam
(74) *Attorney, Agent, or Firm* — Withrow & Terranova, PLLC

(57) ABSTRACT

The performance of a voice conference using a packet-based conference bridge can be improved with a number of modifications. In one modification, the conference bridge receives speech indication signals from the individual packet-based terminals within the voice conference, these speech indication signals then being used by the conference bridge to select the talkers within the voice conference. This removes the need for speech detection techniques within the conference bridge, hence decreasing the required processing power and the latency within the conference bridge. In another modification, the conference bridge sends addressing control signals to the individual packet-based terminals selected as talkers, these addressing control signals directing the terminals selected as talkers to directly transmit their voice data packets to the other terminals within the voice conference. This direct transmission of voice data packets can reduce transcoding and latency within the network. These two modifications could further be combined, resulting in a conference bridge that receives speech indication signals, selects the talkers for the voice conference and outputs addressing control signal to the talkers. In this case, the advantages of the two modifications are gained as well as additional capacity advantages resulting from no voice signals actually traversing the conference bridge.

32 Claims, 14 Drawing Sheets

U.S. PATENT DOCUMENTS

| | | | |
|---|---|---|---|
| 6,606,305 B1 * | 8/2003 | Boyle et al. | 370/260 |
| 6,606,306 B1 * | 8/2003 | Lin et al. | 370/261 |
| 6,654,455 B1 * | 11/2003 | Isaka | 379/202.01 |
| 6,704,769 B1 * | 3/2004 | Comstock et al. | 709/204 |
| 6,754,322 B1 * | 6/2004 | Bushnell | 379/202.01 |
| 6,792,092 B1 * | 9/2004 | Michalewicz | 379/202.01 |
| 6,810,116 B1 | 10/2004 | Sorensen et al. | 379/202.01 |
| 6,850,609 B1 * | 2/2005 | Schrage | 379/202.01 |
| 6,876,734 B1 * | 4/2005 | Summers et al. | 379/202.01 |
| 6,940,826 B1 * | 9/2005 | Simard et al. | 370/260 |
| 6,956,828 B2 * | 10/2005 | Simard et al. | 370/260 |
| 7,006,616 B1 * | 2/2006 | Christofferson et al. | 379/202.01 |
| 7,058,026 B1 * | 6/2006 | Hera et al. | 370/265 |

* cited by examiner

PRIOR ART

APPARATUS AND METHOD FOR PACKET-BASED MEDIA COMMUNICATIONS

CROSS REFERENCE TO RELATED APPLICATION

This application is a Continuation Application of U.S. patent application Ser. No. 09/750,015 filed Dec. 29, 2000, now U.S. Pat. No. 6,956,828.

FIELD OF THE INVENTION

This invention relates generally to packet-based media communications and more specifically to media conferencing within a packet-based communication network.

BACKGROUND OF THE INVENTION

Prior to the use of packet-based voice communications, telephone conferences were a service option available within standard non-packet-based telephone networks such as Pulse Code Modulation (PCM) telephone networks. As depicted in FIG. 1A, a standard telephone switch 15 is coupled to a plurality of telephone terminals 16 to be included within a conference session as well as a conference bridge 17. It is noted that these telephone terminals 16 are coupled to the telephone switch 15 via numerous other telephone switches (not shown). The telephone switch 15 forwards any voice communications received from the terminals 16 to the conference bridge 17, which then utilizes a standard algorithm to control the conference session.

One such algorithm used to control a conference session, referred to as a "party line" approach, comprises the steps of mixing the voice communications received from each telephone terminal 16 within the conference session and further distributing the result to each of the telephone terminals 16 for broadcasting. A problem with this algorithm is the amount of noise that is combined during the mixing step, this noise comprising a background noise source corresponding to each of the telephone terminals 16 within the conference session.

An improved algorithm for controlling a conference session is disclosed within U.S. patent application Ser. No. 08/987,216 entitled "Method of Providing Conferencing in Telephony" by Dal Farra et al, filed on Dec. 9, 1997, assigned to the assignee of the present invention, and herein incorporated by reference. This algorithm comprises the steps of selecting primary and secondary talkers, mixing the voice communications from these two talkers and forwarding the result of the mixing to all the participants within the conference session except for the primary and secondary talkers. The primary and secondary talkers receive the voice communications corresponding to the secondary and primary talkers respectively. The selection and mixing of only two talkers at any one time can reduce the background noise level within the conference session when compared to the "party line" approach described above.

In a standard PCM telephone network as is depicted in FIG. 1A, all of the voice communications are in PCM format when being received at the conference bridge 17 and when being sent to the individual telephone terminals 16. Hence, in this situation, the mixing of the voice communications corresponding to the primary and secondary talkers is relatively simple with no conversions of format required.

Currently, packet-based voice communications are being utilized more frequently as Voice-over-Internet Protocol (VoIP) becomes increasingly popular. In these standard VoIP communications, voice data in PCM form is being encapsulated with a header and footer to form voice data packets; the header in these packets has, among other things, a Real Time Protocol (RTP) header that contains a time stamp corresponding to when the packet was generated. One area that requires considerable improvement is the use of packet-based voice communications to perform telephone conferencing capabilities.

As depicted within FIG. 1B, a plurality of packet-based voice communication terminals, terminals A,B,C 22,24,26 in this case, are coupled to a packet-based network 20. Currently, in order for the users of these terminals 22,24,26 to communicate within a voice conference, a packet-based voice communication central bridge 28 must be coupled to the packet-based network 20. This conference bridge 28 has a number of problems. These problems include the latency inherently created within the conference bridge 28, the considerable amount of signal processing power required, the cost of the conference bridge, the limited input/output capacity of the conference bridge, and the maintenance and management of the conference bridge that is required. It should be noted that the high signalling power required is partially due to the conference bridge 28 having to compensate for a variety of problems that typically exist within current packet-based networks. These problems include possible variable delays, out-of-sequence packets, lost packets, and/or unbounded latency.

FIG. 2 is a logical block diagram of a well-known conference bridge design that could be implemented within the network of FIG. 1B. In this design, the conference bridge 28 comprises an inputting apparatus 30, an energy detection, talker selection and mixing block 32 and an outputting apparatus 34. Typically all three of these blocks are implemented in software.

The inputting apparatus 30 performs a number of functions on the packets that are received at the conference bridge 28 from the terminals within a voice conference. These functions include protocol stack, jitter buffer and decompression operations. During the protocol stack operation, the inputting apparatus 30 receives packets comprising compressed voice signals, hereinafter referred to as voice data packets, and strips off the packet overhead required for transmitting the voice data packets through the packet-based network 20. During the jitter buffer operation, the inputting apparatus 30 receives the compressed voice signals, ensures that the compressed voice signals are within the proper sequence (i.e. time ordering signals), buffers the compressed voice signals to ensure smooth playback and ideally implements packet loss concealment. During the decompression operation, the inputting apparatus 30 receives the buffered compressed voice signals, converts them into standard PCM format and outputs the resulting voice signals (that are in Pulse Code Modulation) to the energy detection, talker selection and mixing block 32.

The energy detection, talker selection and mixing block 32 performs almost identical functionality to the conference bridge 17 within FIG. 1A. The key to the design of a conference bridge 28 as depicted in FIG. 2 is the inputting block 30 transforming the packet-based voice communications into PCM voice communications so the well-known conferencing algorithms can be utilized within the block 32. As described previously, in one conferencing algorithm, primary and secondary talkers are selected for transmission to the participants in the conference session to reduce the background noise level from participants who are not talking and to simplify the mixing algorithm required. The selection of primary and secondary talkers is performed with an energy detection operation to determine the voice conference participants that are speaking, followed by a talker selection operation to choose the primary and secondary talkers and a mixing operation to mix the voice communications received from the primary and secondary talkers. The resulting output from the block 32 is a voice communication consisting of a mix between the voice communications received from the primary and secondary talkers. Further outputs from the block 32 include the unmixed voice communications of the primary and secondary talkers that are to be forwarded, as described previously, to the secondary and primary talkers respectively.

The outputting apparatus 34 performs a number of functions on the outputs from the block 32, these functions including compression and transmission operations. During the compression operation, the outputting apparatus 34 receives and compresses respective ones of the three outputs from the energy detection, talker selection and mixing block 32. During the transmission operation, the outputting apparatus 34 performs a protocol stack operation on the compressed voice signals, encapsulates the compressed voice signals within the packet-based format required for transmission on the packet-based network 20 and transmits voice data packets comprising the compressed voice signals to the appropriate terminals 22,24,26 within the conference session. It is noted that, in the case of the talker selection algorithm described above, the mixed voice signal is forwarded to all the terminals with the exception of the primary and secondary talkers while the primary and secondary talkers are sent the appropriate unmixed voice signals.

One problem with the setup depicted within FIG. 2 is the degradation of the voice signals as the voice signals are converted from PCM format to compressed format and vice versa within the conference bridge 28, these conversions together being referred to generally as transcoding. A further problem results from the considerable latency that the processing within the conference bridge 28. The latency of this processing can result in a significant delay between when the talker(s) speaks and when the other participants in the conference session hear the speech. This delay can be noticeable to the participants if it is beyond the perceived real-time limits of human hearing. This could result in participants talking while not realizing that another participant is speaking. Yet another key problem with the design depicted in FIG. 2 is the considerable amount of signal processing power that is required to implement the conference bridge 28. As stated previously, each of the components shown within FIG. 2 are normally simply software algorithms being run on DSP components(s). This considerable amount of required signal processing power is expensive. Even further, another key problem within current conference bridge designs is their limited input/output capacity. This limited capacity is not always significant but could be exceeded in cases where there are large numbers of participants within the conference session. As well, a large number of participants within a conference session could put a strain on the capacity of the packet-based network 20 itself due to the concentration of traffic that occurs with the use of packet-based conference bridges.

Hence, a new design within a packet-based voice communication network is required to implement voice conferencing functionality. In this new design, a reduction in transcoding, latency and/or required signal processing power within the conferencing network is needed.

SUMMARY OF THE INVENTION

The present invention is directed to methods and apparatus that can be utilized within a packet-based media communication system for media conferences. In one embodiment of the present invention, a packet-based conference bridge receives speech indication signals from the individual packet-based terminals within a voice conference, these speech indication signals being used to select the talkers within the voice conference. The speech indication signals could be a talking/listening indication, an energy level indication or another parameter that a talker selection algorithm could use to select packet-based terminals as talkers. In another embodiment of the present invention, the packet-based conference bridge sends addressing control signals to the individual packet-based terminals selected as talkers. These addressing control signals indicate the packet-based network addresses for all the packet-based terminals that the talker should directly transmit its voice data packets to. A yet other embodiment of the present invention combines the use of both of the above embodiments such that the packet-based conference bridge essentially comprises a talker selection block that receives speech indication signals from packet-based terminals within a voice conference and transmits addressing control signals to the terminals that are selected as talkers in order to direct the voice data packets from the talker(s) to the appropriate other packet-based terminals within the voice conference.

There are numerous advantages of the embodiments of the present invention compared to well-known voice conferencing techniques. For one, all of the embodiments of the present invention reduce the amount of processing power required within the conference bridges. This is done by removing the need for an energy detection block and/or an outputting apparatus within the conference bridge. This, in turn, can reduce the latency for the voice data packets. Another advantage of some embodiments of the present invention is a reduced transcoding that must be done. This reduction could be caused by the reduced need to decompress the compressed voice signals within the conference bridge due to the independently received speech detection signals. Further, by transmitting voice data packets in some embodiments directly between the source of the voice data packets to the destination of the voice data packets, a significant reduction in transcoding can be achieved. Yet another advantage of embodiments of the present invention is the reduced concentration of traffic that results from the implementation of the combined embodiments. In this case, the conference bridge does not receive or transmit high bandwidth voice data packets, but rather receives and transmits control signals to manage the voice conference. This also reduces any strain that might occur on the limited input/output capacity for the conference bridge.

The present invention, according to a first broad aspect, is a conference bridge including an input unit, a talker selection unit and an output unit. The input unit operates to receive at least one media data packet from at least two sources forming a media conference, each media data packet defining a media signal. The talker selection unit operates to receive speech indication signals from at least one of the sources within the media conference and to process the speech indication signals including selecting a set of the sources within the media conference as talkers. The output unit operates to output the media signals that correspond to the set of sources within the media conference selected as talkers.

The present invention, according to a second broad aspect, is a conference bridge including an input unit, an energy detection and talker selection unit and an output unit. The input unit operates to receive at least one media data packet from at least two sources forming a media conference, each media data packet defining a media signal. The energy detection and talker selection unit operates to determine at least one speech parameter corresponding to each of the media signals and select a set of the sources within the media conference as talkers based on the determined speech parameters. The output unit operates to output addressing control signals to the sources within the media conference selected as talkers. The addressing control signals comprise instructions for the sources within the media conference selected as talkers to output their media signals directly to other sources within the media conference.

The present invention, according to a third broad aspect, is a conference bridge arranged to be coupled to a packet-based network that includes at least two sources of media signals forming a media conference. In this aspect, the conference bridge includes a talker selection unit similar to that of the first broad aspect and an output unit similar to the second broad aspect.

According to a fourth broad aspect, the present invention is a packet-based apparatus arranged to be coupled to a conference bridge via a packet-based network. The packet-based apparatus including an output unit and a speech detection unit. The output unit operates to receive at least one media signal from at least one participant within a media conference and output the received media signal to the conference bridge via the packet-based network. The speech detection unit operates to process the received media signal, generate a speech indication signal based upon the received media signal and output the speech indication signal to the conference bridge.

According to a fifth broad aspect, the present invention is a packet-based apparatus arranged to be coupled to a conference bridge via a packet-based network, the apparatus including an addressing control unit and an output unit. The addressing control unit operates to receive at least one addressing control signal from the conference bridge. The output unit operates to receive at least one media signal from at least one participant within a media conference and output the received media signal, via the packet-based network, to at least one other participant within the media conference based upon the addressing control signal. In another embodiment of the fifth broad aspect, the apparatus further includes a speech detection unit similar to that of the fourth broad aspect.

In yet further aspects, the present invention is a method for controlling a media conference, a method for a packet-based apparatus to operate within a media conference controlled by a conference bridge and a network incorporating a conference bridge according to one of the first three broad aspects.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention are described with reference to the following figures, in which.

DETAILED DESCRIPTION OF THE PREFERRED EMBODIMENTS

The present invention is directed to a number of different methods and apparatus that can be utilized within a packet-based voice communication system. Primarily, the embodiments of the present invention are directed to methods and apparatus used for voice conferences within packet-based communication networks, but this is not meant to limit the scope of the present invention.

One skilled in the art would understand that there are two essential sectors for the operations of a telephone session. These sectors include a control plane that performs administrative functions such as access approval and build-up/tear-down of telephone sessions and/or conference sessions and a media plane which performs the signal processing required on media (voice or video) streams such as format conversions and mixing operations. As described below, the present invention is applicable to modifications within the media plane which could be implemented with a variety of different control planes while remaining within the scope of the present invention.

Embodiments of the present invention described herein below are directed to packet-based conference bridges and packet-based apparatus coupled within a packet-based network that enable media conferences between numerous sources of media signals. These sources of media signals can be any device in which a person can output media data for transmission within the packet-based network. In some embodiments, the packet-based apparatus are packet-based terminals coupled together with the packet-based conference bridge within a packet-based network, each of the packet-based terminals being a source for media signals for the other packet-based apparatus.

Figure 3:
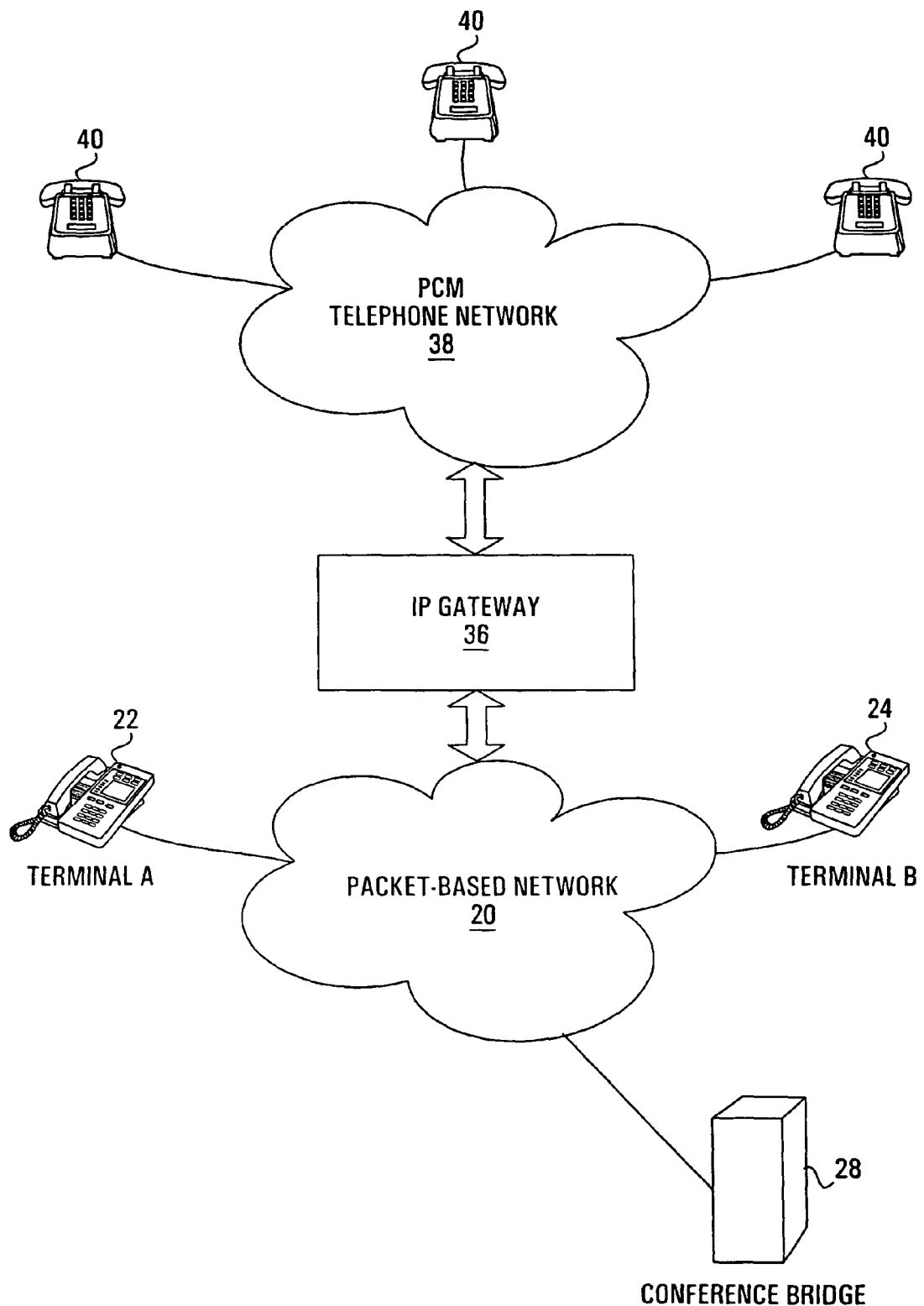
FIG. 3 is a simplified block diagram illustrating a well-known packet-based network coupled to a well-known PCM telephone network with a voice conferencing capability.

In other embodiments, one or more of the packet-based apparatus are packet-based network interfaces which couple standard non-packet-based terminals, such as PCM or analog telephone terminals, to a packet-based network, each of the non-packet-based terminals being a source for media signals for the media conference. This situation is illustrated within FIG. 3 in which a non-packet-based telephone network, in this case PCM telephone network 38, is coupled to the packet-based network 28, via a packet-based network interface, in this case IP Gateway 36. As shown in FIG. 3, a number of standard PCM telephone terminals 40 are coupled to the PCM telephone network 38, these PCM telephone terminals 40 possibly being considered as sources of media signals within embodiments of the present invention. Further, sources of media signals could be other devices that allow for the outputting of media data.

In the following description, it should be understood that despite referring to the sources of media signals as packet-based terminals within the packet-based network throughout this document, such references could alternatively be directed to another form of media signal source. Further, although the packet-based apparatus described below are the packet-based terminals that also serve as the source for media signals, it should be understood that, alternatively, the packet-based apparatus could be packet-based network interfaces. Yet further, although the following description of the present invention is specific to voice data packets that contain compressed voice signals and generally to voice conferencing, this should not limit the scope of the present invention as is described in further detail herein below.

A first embodiment of the present invention, in which reduced processing is required within the packet-based conference bridge compared to well-known conference bridge designs, is now described with reference to FIGS. 4, 5, 6A and 6B. In this embodiment, speech indication signals are sent from the packet-based terminals 22, 24,26 within the voice conference to the packet-based conference bridge 28 so that no speech detection operation needs to be performed within the conference bridge itself. In one implementation, these speech indication signals simply indicate if a participant corresponding to a particular packet-based terminal is speaking or not. In other implementations, the speech indication signals indicate other parameters that could be utilized by a talker selection algorithm to select a set of the packet-based terminals as talkers. For example, in one implementation, the parameters within the speech indication signals correspond to the energy level of the speech associated with the participants at the particular packet-based terminals.

Figure 1A:
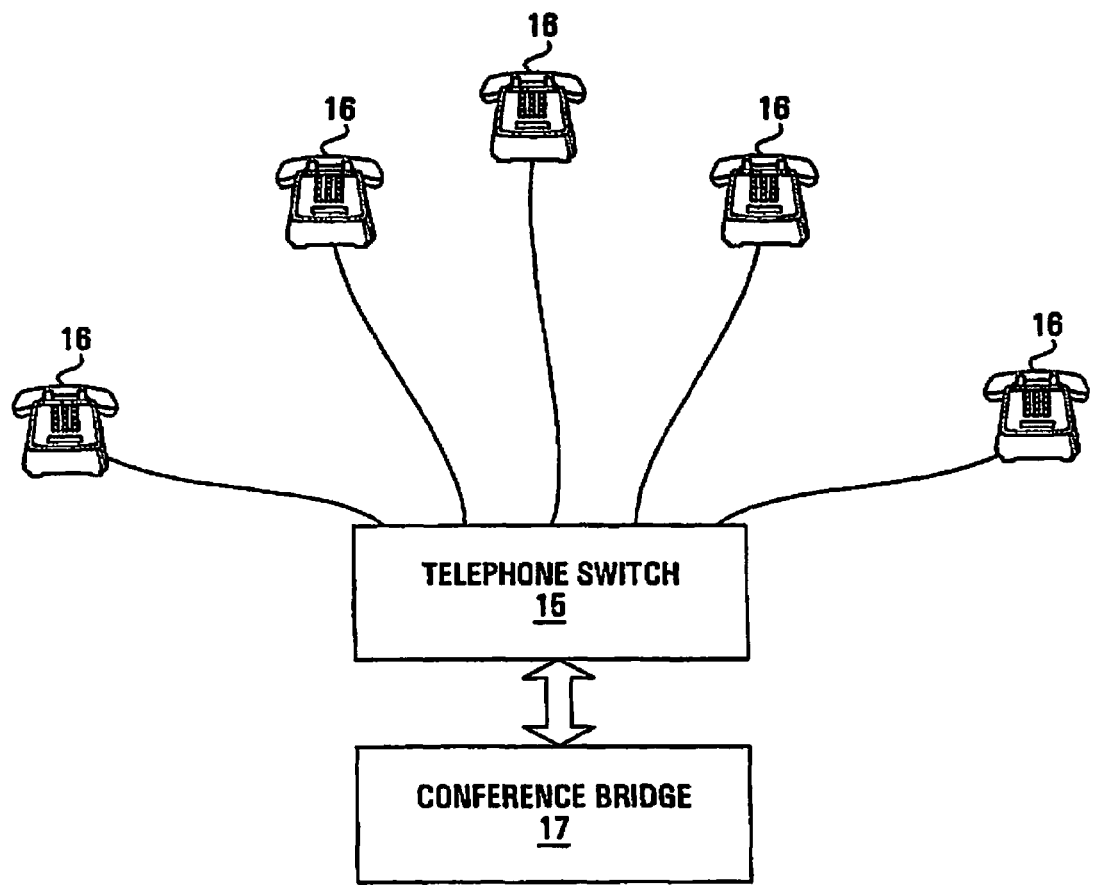
FIG. 1A is a simplified block diagram illustrating a well-known circuit switched network with a voice conferencing capability.
Figure 1B:
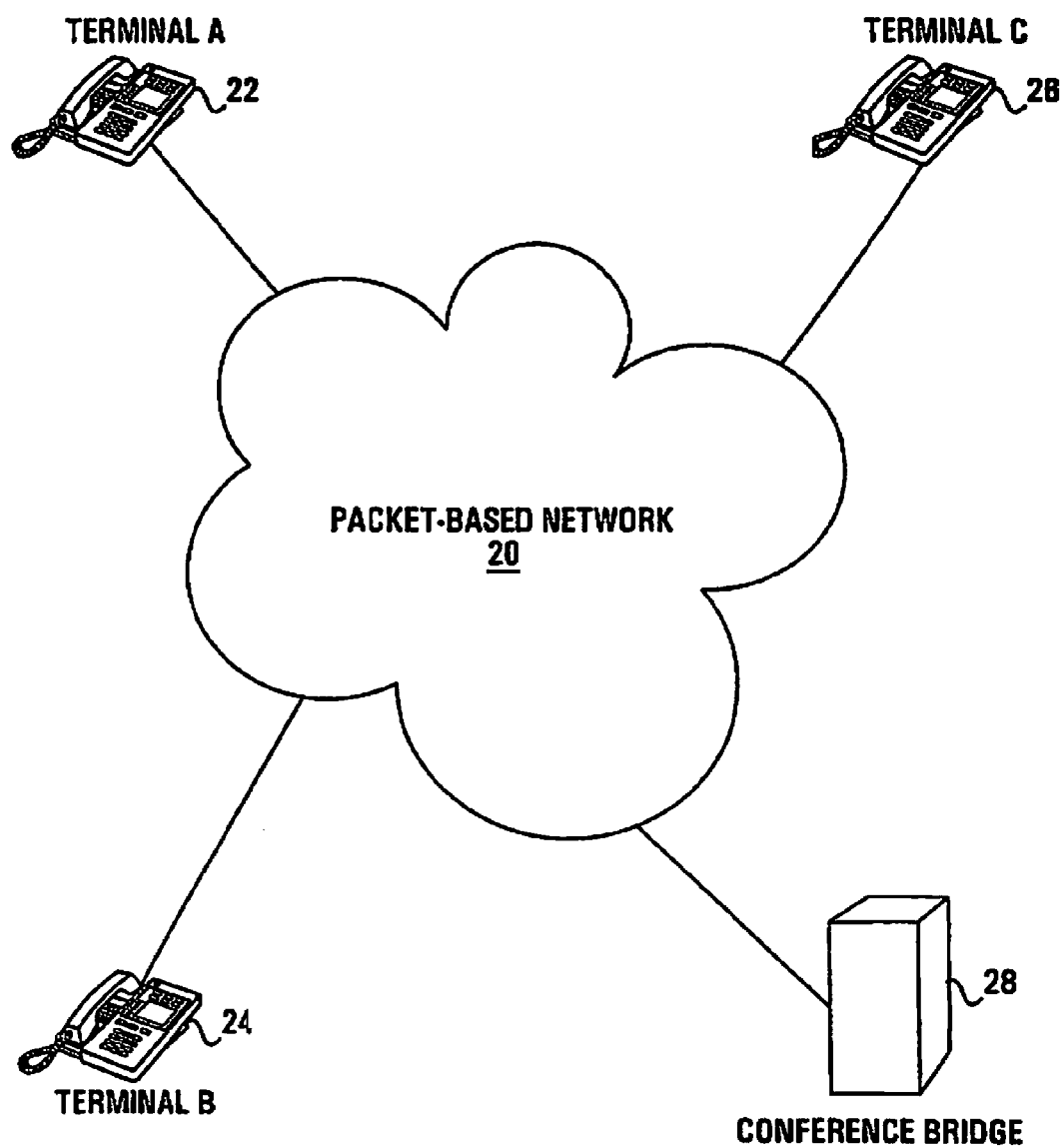
FIG. 1B is a simplified block diagram illustrating a well-known packet-based network with a voice conferencing capability.
Figure 2:
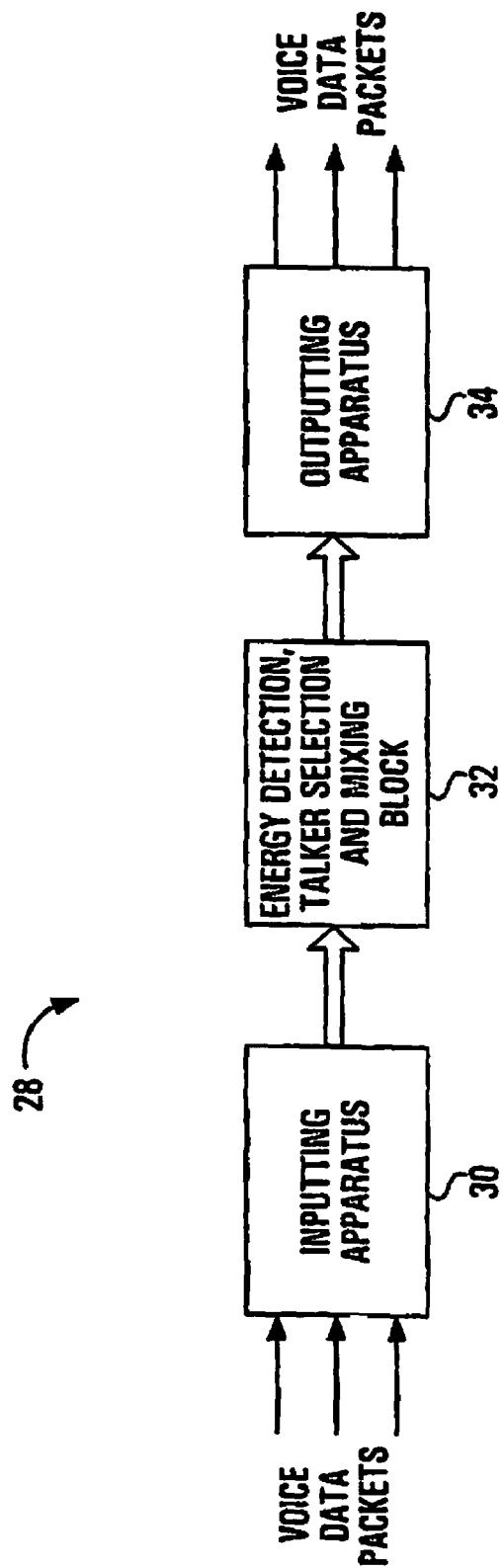
FIG. 2 is a logical block diagram illustrating a well-known packet-based conference bridge implemented within the packet-based network of FIG. 1B.
Figure 4:
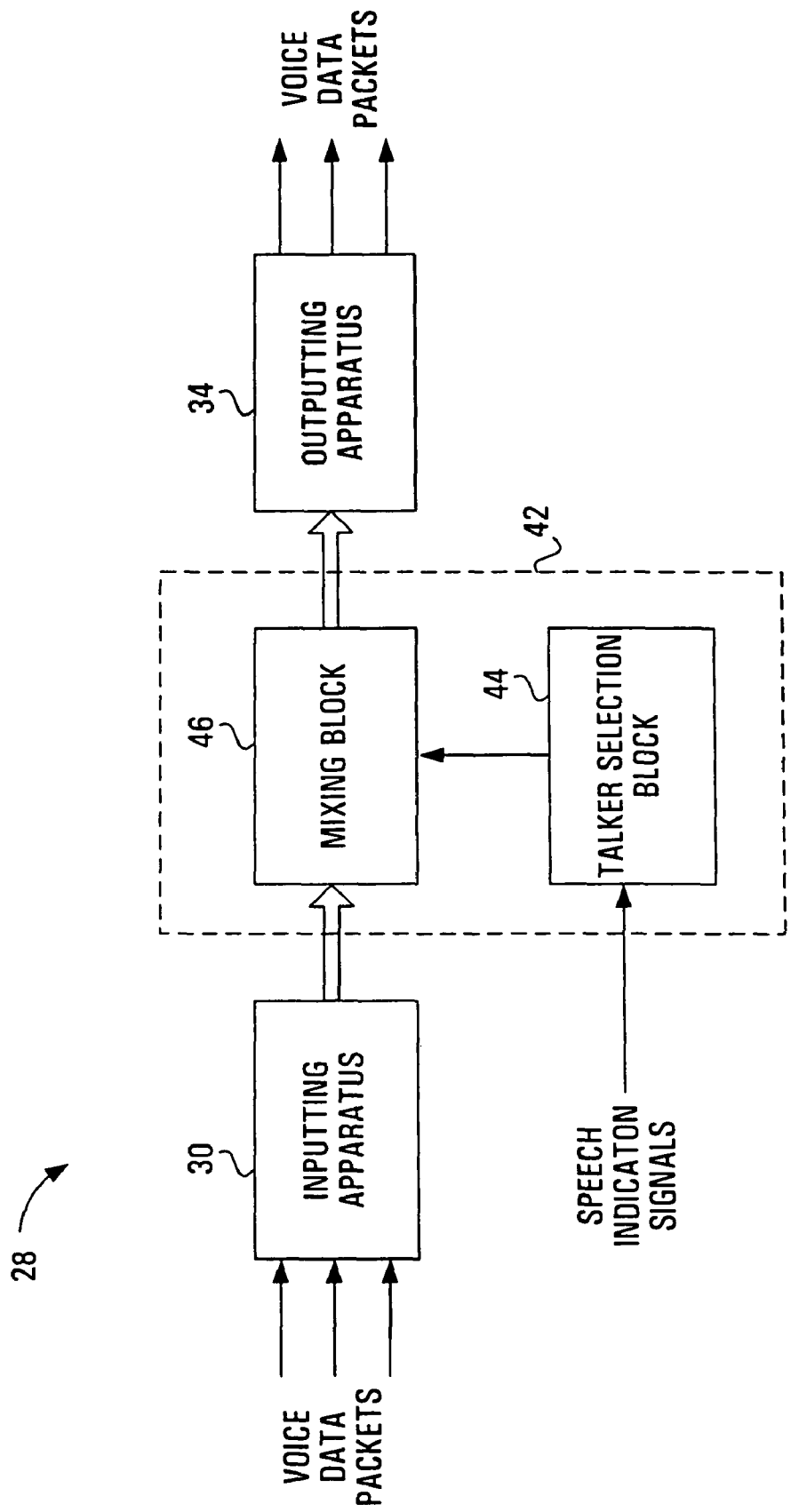
FIG. 4 is a logical block diagram illustrating a packet-based conference bridge according to a first embodiment of the present invention.

FIG. 4 is a logical block diagram illustrating a packet-based conference bridge according to this first embodiment of the present invention. This packet-based conference bridge replaces within FIG. 1B, the well-known packet-based conference bridge depicted within FIG. 2. As depicted in FIG. 4, the packet-based conference bridge 28 comprises the inputting apparatus 30 and the outputting apparatus 34 similar to that described above with reference to FIG. 2. The difference in the packet-based conference bridge 28 of FIG. 4 is the replacement of energy detection, talker selection and mixing block 32 with a talker selection and mixing block 42. In this embodiment, the block 42 comprises a talker selection block 44 that receives the speech indication signals from the packet-based terminals within the voice conference and a mixing block 46 that is coupled between the inputting and outputting blocks 30,34 and further is coupled to the talker selection block 44.

In operation, the talker selection block 44 receives the speech indication signals from the packet-based terminals within the voice conference, via the packet-based network 20, and performs a predefined talker selection algorithm. This talker selection algorithm could be similar to that disclosed within U.S. patent application Ser. No. 08/987,216, as incorporated by reference herein above, in which primary and secondary talkers are selected, though the present invention should not be limited to this implementation. During the selection of talkers by the talker selection block 44, the technique used depends upon the particular design. For instance, in one implementation, talkers are selected based upon the order in which participants in the voice conference begin to speak. In this case, the talkers are selected as the first terminals which send speech indication signals to the talker selection block 44 indicating that a participant local to the particular packet-based terminal has begun to speak. In other designs, the energy level of the voice signals, as indicated within the speech indication signals received from the packet-based terminals, is used by the talker selection block 44 to select the talkers. In yet other designs, some of the talkers could be pre-selected while the talker selection block 44 uses the speech indication signals simply to select the other talker(s) within the voice conference. This could be applicable in cases that a monitor or prearranged speaker for the voice conference is always selected as a talker.

Within the implementation of FIG. 4, the mixing block 46 within FIG. 4 receives the selection of talkers within the voice conference from the block 44, this selection of talkers comprising the identification of primary and secondary talkers in one implementation; performs a mixing operation on the voice signals corresponding to the talkers; and forwards the mixed voice signals and the unmixed voice signals corresponding to the selected talkers to the outputting apparatus 34. In this case, the outputting apparatus 34 encapsulates and forwards the mixed voice signals to all of the packet-based terminals within the voice conference except the terminals that have been selected as talkers. Further, the outputting apparatus 34 encapsulates the unmixed voice signals corresponding to the talkers within the voice conference and forwards the resulting voice data packets such that each of the talkers receives the voice signals corresponding to the other talkers within the voice conference. If there is only a single talker selected by the talker selection block 44, the mixing block 46 acts simply as a selector of the voice signals corresponding to the sole talker, these voice signals being forwarded to the outputting apparatus 34. The outputting apparatus 34 encapsulates and forwards these selected voice signals to all the packet-based terminals within the voice conference except the terminal selected as the talker.

It should be noted that a procedure for de-selecting talkers is another operation within the talker selection block 44. In one embodiment, the de-selection of a packet-based terminal as a talker occurs if a speech indication signal received from the particular terminal indicates that a participant local to the terminal has stopped speaking. In another embodiment, the de-selection of a packet-based terminal as a talker occurs if speech indication signals received from the particular terminal indicate the speech from a participant local to the terminal has decreased in energy. In yet another embodiment, the de-selection of a terminal as a talker is performed if a predetermined time interval is passed since the receipt of a speech indication signal that indicates that the particular terminal has a participant local to the terminal speaking.

There are numerous alternative implementations for the packet-based conference bridge according to the first embodiment of the present invention. For one, modifications within the conference bridge could be made similar to those described within U.S. patent application Ser. No. 09/475,047 entitled "APPARATUS AND METHOD FOR PACKET-BASED MEDIA COMMUNICATIONS" by Simard et al, filed on Dec. 29, 1999 and incorporated herein by reference. As indicated within U.S. patent application Ser. No. 09/475,047, there are numerous implementations for the inputting apparatus 30, talker selection and mixing block 42 and the outputting apparatus 34 possible. For instance, the jitter buffer operation could be removed from the inputting apparatus 30 in some implementations. Further, in some implementations, the inputting apparatus 30 does not need to perform a decompression operation and the outputting apparatus 34 does not need to perform a compression operation on any voice signals corresponding to talkers which do not require a mixing operation. This reduced transcoding can result in higher quality voice signals being broadcast to the participants of the voice conference as well as reduce the latency of the voice data packets through the conference bridge 28.

In yet further alternatives, the talker selection block 44 is coupled to the inputting apparatus 30 so as to prevent the unnecessary processing of voice data packets that are received from packet-based terminals that are not selected as talkers. This can be accomplished with the present invention since the selection of the talkers within the voice conference is independent of the processing of the received voice data packets.

It should be noted that although the blocks 30,34,44,46 within FIG. 4 are depicted as separate components, these blocks are meant to be logical representations of algorithms which are hereinafter referred to collectively as conference processing logic. Preferably, some or all of the conference processing logic is essentially software algorithms operating within a single control component such as a DSP. In alternative embodiments, some or all of the conference processing logic is comprised of hard logic and/or discrete components.

Figure 5:
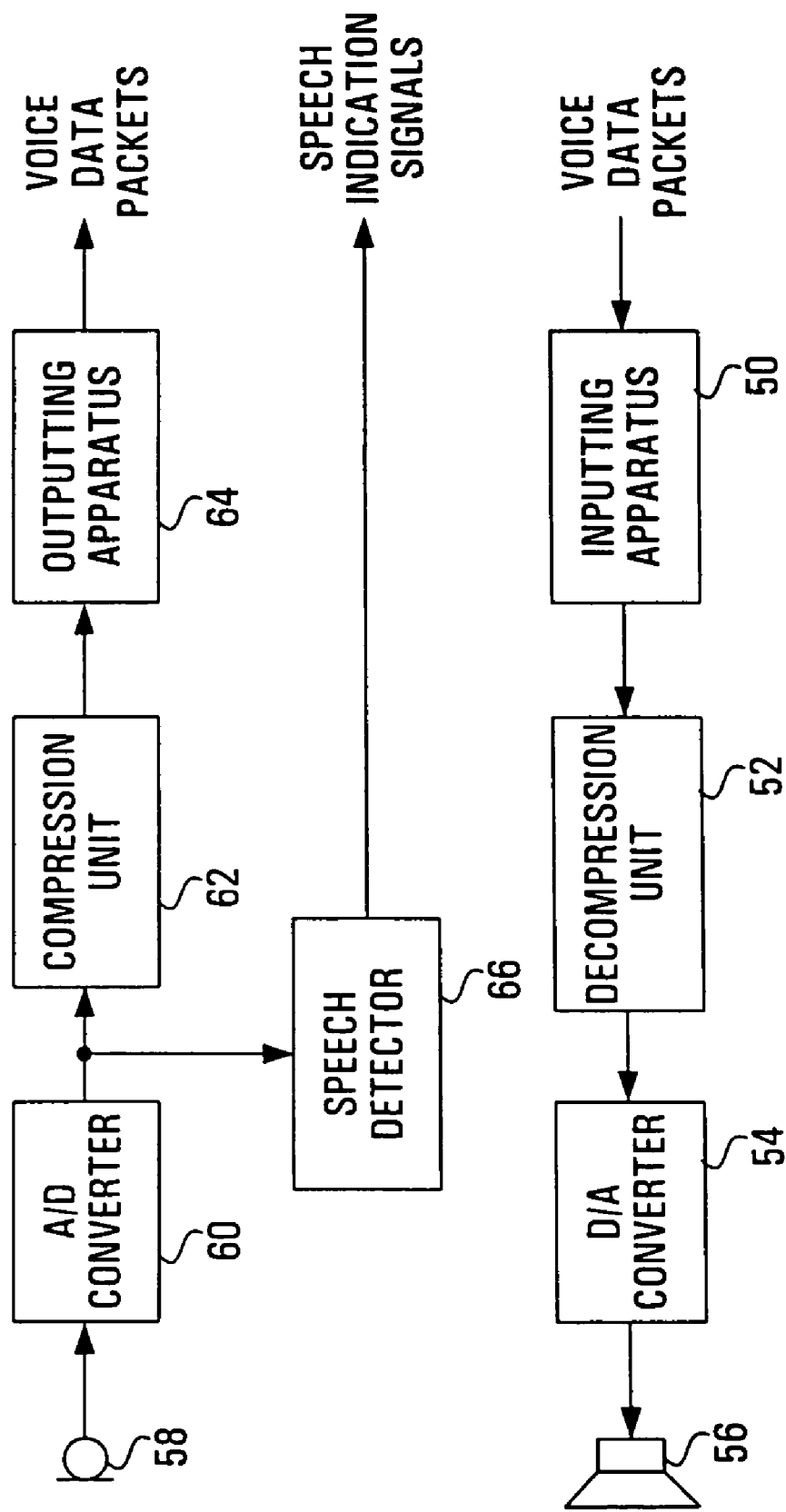
FIG. 5 is a logical block diagram illustrating a packet-based terminal according to the first embodiment of the present invention.

FIG. 5 is a logical block diagram illustrating a packet-based terminal according to the first embodiment of the present invention. As depicted in FIG. 5, the packet-based terminal comprises an inputting apparatus 50 that receives, via the packet-based network 20, voice data packets from the packet-based conference bridge 28, the inputting apparatus 50 being coupled in series with a decompression unit 52, a Digital-to-Analog (D/A) converter 54 and a speaker 56. Further, the packet-based terminal comprises a microphone 58 coupled in series with an Analog-to-Digital converter 60, a compression unit 62 and an outputting apparatus 64. Yet further, as depicted in FIG. 5, the packet-based terminal according to the first embodiment of the present invention comprises a speech detector 66 coupled to the output of the A/D converter 60.

In operation, the inputting apparatus 50 receives the voice data packets output from the packet-based conference bridge 28 and, along with the decompression unit 52, performs similar operations as described above for the inputting apparatus 30 within FIGS. 2 and 4. That is, the inputting apparatus 50 combined with the decompression unit 52 performs protocol stack, jitter buffer and decompression operations. The outputs from the decompression unit 52 are decompressed voice signals corresponding to the voice data packets received from the packet-based conference bridge 28, these outputs subsequently being input to the D/A converter 54 which converts the voice signals into an analog format and feeds the analog voice signals to the speaker 56. The speaker 56 broadcasts the voice signals such that a participant in the voice conference that is local to the packet-based terminal can hear the speech of the talkers within the voice conference.

The microphone 58 operates to receive sound waves local to the microphone 58 and generate analog voice signals corresponding to the sound waves, these analog voice signals being input to the A/D converter 60. The A/D converter 60 converts the analog voice signals to a digital format and forwards these voice signals to the compression unit 62. The compression unit 62 combined with the outputting apparatus 64 perform similar operations to those described above for the outputting apparatus 34 within FIGS. 2 and 4. That is, the compression unit 62 combined with the outputting apparatus 64 perform a compression operation followed by a transmission operation. During the transmission operation, the outputting apparatus 64 performs a protocol stack operation on the compressed voice signals, encapsulates the compressed voice signals within the packet-based format required for transmission on the packet-based network 20 and transmits voice data packets comprising the compressed voice signals to the inputting apparatus 30 within the packet-based conference bridge 28.

Both of the above described operations within the packet-based terminal of FIG. 5 are performed within well-known packet-based terminals. The difference with the packet-based terminal according to the first embodiment of the present invention as depicted in FIG. 5 is the use of the speech detector 66 to receive the uncompressed digital voice signals from the A/D converter 60 and process these signals in order to generate speech indication signals that are forwarded to the packet-based conference bridge 28 via the packet-based network 20. In one implementation, the speech detector 66 determines whether a participant local to the microphone is speaking or not by measuring the energy level of the voice signal being output from the A/D converter 60. If the energy level is above a predetermined energy threshold, the speech detector 66 determines that a participant within the voice conference local to its particular packet-based terminal is speaking and, as a result, subsequently sends a speech indication signal indicating that a speaking participant is at the particular terminal. This speech indication signal is hereinafter referred to as a talking signal. If the energy level is not above the predetermined threshold, the speech detector 66 sends a speech indication signal indicating that only listeners are at the particular terminal. This speech indication signal is hereinafter referred to as a listening signal.

There are numerous alternative implementations for the speech detector 66. For instance, in one implementation, the speech detector 66 sends the talking signal to the packet-based conference bridge 28 when it first detects the energy level of the received voice signals have exceeded the predetermined energy threshold for a first predetermined time interval and sends the listening signal to the packet-based conference bridge 28 when it detects the energy level of the received voice signals are below the predetermined energy threshold for a second predetermined time interval.

In other embodiments, the speech indication signals are not talking and listening signals respectively. Instead, the speech indication signals correspond to specific parameters extracted from the received voice signals. For instance, the speech indication signals in one implementation correspond to energy levels for the voice signals. In one example, these speech indication signals could be nil energy (0), a low energy level (E1) or a high energy level (E2). For this example, multiple energy thresholds could be used for comparison in order to classify the energy level of talking at the specific packet-based terminal. In another implementation, the extracted parameters from the voice signals could be the pitch of the voice signals. In this case, the pitch could either be directly forwarded to the talker selection block 44 or, alternatively, a determination could take place within the speech detector 66 on whether the pitch indicates that there is speech or not. In the alternative case, a talking or listening signal as described above could be sent after processing the pitch values.

It should be noted that, although not illustrated within FIG. 5, an echo cancellation algorithm would need to be implemented in the packet-based terminal if a handsfree mode was functional within the terminal. This echo cancellation algorithm would compensate the voice signals received at the microphone 58 for the signals broadcast from the speaker 56. In one embodiment, the speech detector 66 receives voice signals output from the decompression unit 52 for echo cancellation reference signals. In this case, the echo cancellation reference signals are used to compensate the signals received from the A/D converter 60 so that the signals broadcast from the speaker 56 do not affect the analysis of the speech detection algorithm. In other implementations, the echo cancellation is performed at the conference bridge 28 with the talker selection block 44 compensating speech indication signal parameters received from packet-based terminals based upon the calculated echo effect.

Although the speech detector 66 is illustrated in FIG. 5 as receiving the uncompressed digital voice signals output from the A/D converter 60, it should be noted that this should not limit the scope of the present invention. For instance, in one implementation, the speech detector 66 receives the analog voice signals from the microphone 58. In this case, the speech detector 66 must perform an analog speech detection algorithm to determine if there is speech within the signals.

In other implementations, the speech detector 66 receives the compressed voice signals from the compression unit 62 and/or the voice data packets from the outputting apparatus 64. In these cases, speech detection operations as disclosed within U.S. patent application Ser. No. 09/475,047, previously incorporated by reference, could be utilized. In one implementation, as disclosed within U.S. patent application Ser. No. 09/475,047, a Voice Activity Detection (VAD) operation is enabled at the packet-based terminal. In this embodiment, packets (and therefore compressed voice signals) that contain speech can be distinguished from packets that do not by the number of bytes contained within the packet. In other words, the size of the compressed voice signal can determine whether it contains speech. For example, in the case that the G.723.1 VoIP standard is utilized, voice data packets containing voice would contain a compressed voice signal of 24 bytes while voice data packets containing essentially silence would contain a compressed voice signal of 4 bytes. In another implementation as disclosed within U.S. patent application Ser. No. 09/475,047, the speech detector 66 could determine if there is speech within a compressed voice signal by monitoring a pitch-related sector within the corresponding voice data packet. For example, within the G.723.1 VoIP standard, the pitch sector is an 18-bit field that contains pitch lag information for all subframes. In this particular implementation, the speech detector 66 could use the pitch sector to generate a pitch value for each subframe. If the pitch value is within a particular predetermined range, the corresponding compressed voice signal is said to contain speech. If not, the compressed voice signal is said to not contain speech. This predetermined range can be determined by experimentation or alternatively calculated mathematically. It is noted that many current VoIP standard codecs include pitch information as part of the transmitted packet and a similar comparison of pitch values with a predetermined range can be used with these standards.

Although the blocks within FIG. 5 are depicted as separate components, these blocks are meant to be logical representations of algorithms which are hereinafter referred to collectively as media signal processing logic. Preferably, some or all of the media signal processing logic is essentially software algorithms operating within a single control component such as a DSP. In alternative embodiments, some or all of the media signal processing logic is comprised of hard logic and/or discrete components.

There are a number of advantages of the packet-based network according to the first embodiment of the present invention. For one, there is a decrease in required processing power within the conference bridge 28 compared to well-known designs due to the removal of the energy detection operation from the conference bridge. This removal of the energy detection operation further, as described above, could lead to reduced need for decoding, decompression and transcoding operations and thus to increased quality voice signals with significantly reduced latency.

Figure 6A:
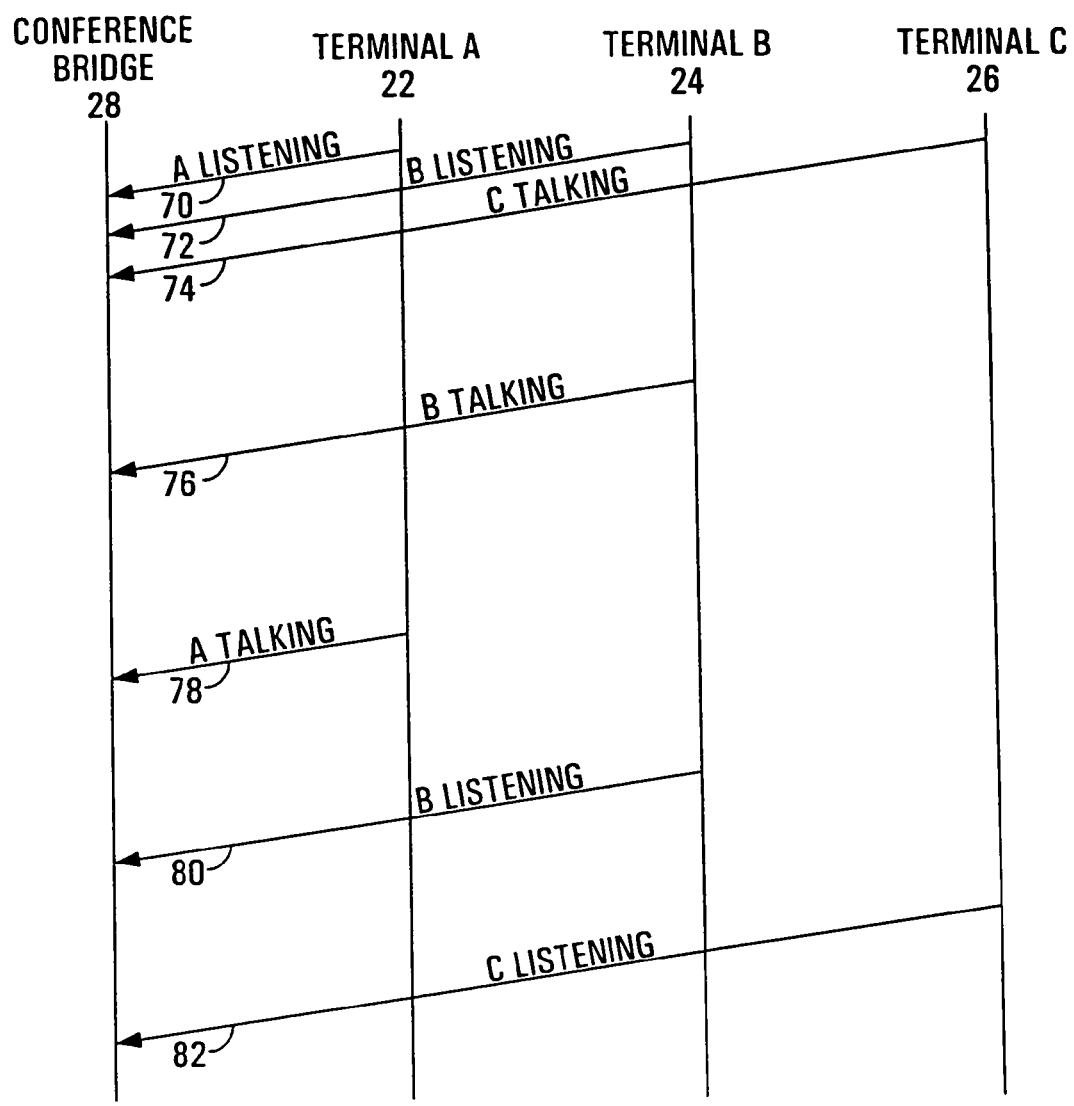
FIGS. 6A and 6B are signalling diagrams illustrating respective first and second sample operations of a packet-based network according to the first embodiment of the present invention.
Figure 6B:
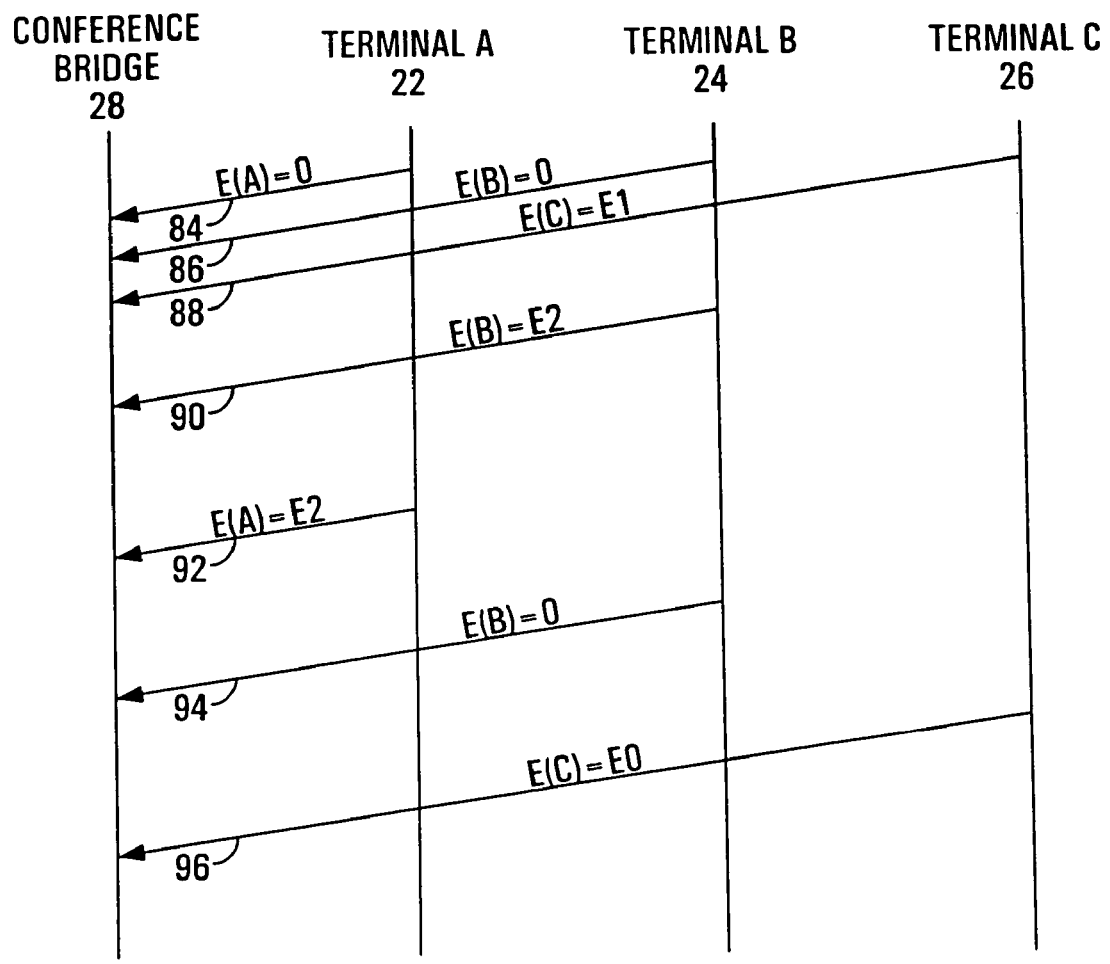

FIGS. 6A and 6B are signalling diagrams illustrating respective first and second sample operations of a packet-based network according to the first embodiment of the present invention. Within FIG. 6A, a voice conference is being initiated between packet-based terminals A,B,C 22,24, 26 using conference bridge 28. In this case, the conference bridge 28 is designed as described herein above with reference to FIG. 4 while each of the packet-based terminals 22,24,26 are designed as described herein above with reference to FIG. 5. The talker selection algorithm within this example includes the selection of primary and secondary talkers based upon the order in which participants begin to speak as described above.

As depicted within FIG. 6A, initially within the signalling diagram, terminals A,B 22,24 transmit listening signals 70,72 to the conference bridge 28, these listening signals 70,72 indicating that no participant within the voice conference local to the terminals A,B 22,24 is speaking. Terminal C 26 is transmitting a talking signal 74 to the conference bridge 28 which indicates that a participant local to the terminal 26 is speaking. At this point, the conference bridge 28 selects the terminal C 26 as the primary talker (or lone talker at this point) and voice signals received from terminal C 26 are transmitted via the conference bridge 28 to the terminals A,B 22,24. Preferably, since no mixing is required within the conference bridge (since there is only a single talker), no transcoding is performed within the conference bridge 28.

Next within the signalling diagram of FIG. 6A, the terminal B 24 transmits a talking signal 76 to the conference bridge 28, this talking signal 76 indicating that a participant within the voice conference local to the terminal B 24 has begun to speak. At this point, the talker selection algorithm within the conference bridge 28 selects the terminal B 24 as the secondary talker in the voice conference. Now, voice signals received from terminals B and C 24,26 are mixed and transmitted to terminal A 22 while voice signals from terminals B and C 24,26 are further transmitted to terminals C and B 26,24 respectively.

Subsequently, terminal A 22 sends a talking signal 78 to the conference bridge 28, this talking signal 78 indicating that a participant within the voice conference local to terminal A 78 has begun to speak. In this case, since primary and secondary talkers are already selected and in this particular example only two talkers are to be selected at a time, no change occurs within the conference bridge 28 due to the receipt of talking signal 78. Essentially, the participant at the terminal A 22 is being muted within the voice conference.

Next as depicted in FIG. 6A, the terminal B 24 transmits a listening signal 80 to the conference bridge 28, this listening signal 80 indicating that the participant local to terminal B 24 has stopped speaking. At this point, terminal B 24 is deselected as the secondary talker and, if the participant at terminal A 22 is still speaking, terminal A 22 would be selected as the secondary talker. Thus, the voice signals from terminal A 22 would subsequently be received at the other terminals 24,26 within the voice conference. Finally, terminal C 26 transmits a listening signal 82 to the conference bridge 28, this listening signal 82 indicating that the participant local to the terminal C 26 has stopped speaking. At this point, terminal A 22 would become the primary talker (or lone talker).

FIG. 6B depicts a signalling diagram similar to that of FIG. 6A but with energy levels corresponding to the voice signals being transmitted as the speech indication signals rather than talking/listening signals. In this case, the energy levels of the voice signals are used to determine the primary and secondary talkers. As depicted in FIG. 6B, initially, terminals A,B,C 22,24,26 transmit respective energy levels E(A),E(B),E(C) 84,86,88 of zero, zero and energy level 1 (E1) to the conference bridge 28. At this point, the terminal C 26 is made the primary talker (and lone talker). Subsequently, terminal B 24 transmits an adjusted energy level E(B) of energy level 2 (E2) to the conference bridge 28. In this case, since E2 is greater than E1, the terminal B 24 becomes the primary talker and terminal C 26 becomes the secondary talker. Next, as depicted in FIG. 6B, terminal A 22 sends an energy level E(A) 92 of E2 to the conference bridge 28 which results in terminal A 22 replacing terminal C 26 as the secondary talker. The participant at terminal C 26 would now be essentially muted from terminals A,B 22,24. Next, terminal B 24 sends an energy level E(B) 94 of zero to the conference bridge 28 indicating that the participant local to terminal B 24 has stopped speaking. Now, terminal A 22 which is still transmitting voice signals at energy level E2 becomes the primary talker and terminal C 26 which is still transmitted voice signals at energy level E1 becomes the secondary talker. Finally within the signalling diagram of FIG. 6B, the terminal C 26 sends an energy level E(C) of zero to the conference bridge 28. This resulting in the deselecting of terminal C 26 as the secondary talker and leaving terminal A 22 as the lone talker.

It should be noted that the above descriptions of sample signalling diagrams within a network according to the first embodiment of the present invention, should not be used to limit the scope of the present invention. This signalling diagrams are included to illustrate two possible implementations of the present invention.

A second embodiment of the present invention, in which the transmission of voice data packets is routed directly between packet-based terminals according to instructions from a packet-based conference bridge, is now described with reference to FIGS. 7, 8, 9 and 10. In this embodiment, addressing control signals are sent from the packet-based conference bridge 28 to the packet-based terminals within a voice conference that are selected as talkers within the conference bridge 28. In this embodiment, the addressing control signals indicate the packet-based network addresses (for example Internet Protocol (IP) addresses within IP networks) of the packet-based terminals that the talkers should be transmitting their voice data packets. With the direct transmission of the voice data packets to the other packet-based terminals within the voice conference, significant reductions in transcoding of the voice signals can be achieved along with reduced latency and decreased processing requirements within the conference bridge. It is noted though, as described herein below, the implementation of the second embodiment of the present invention can result in additional processing requirements within the individual packet-based terminals.

Figure 7:
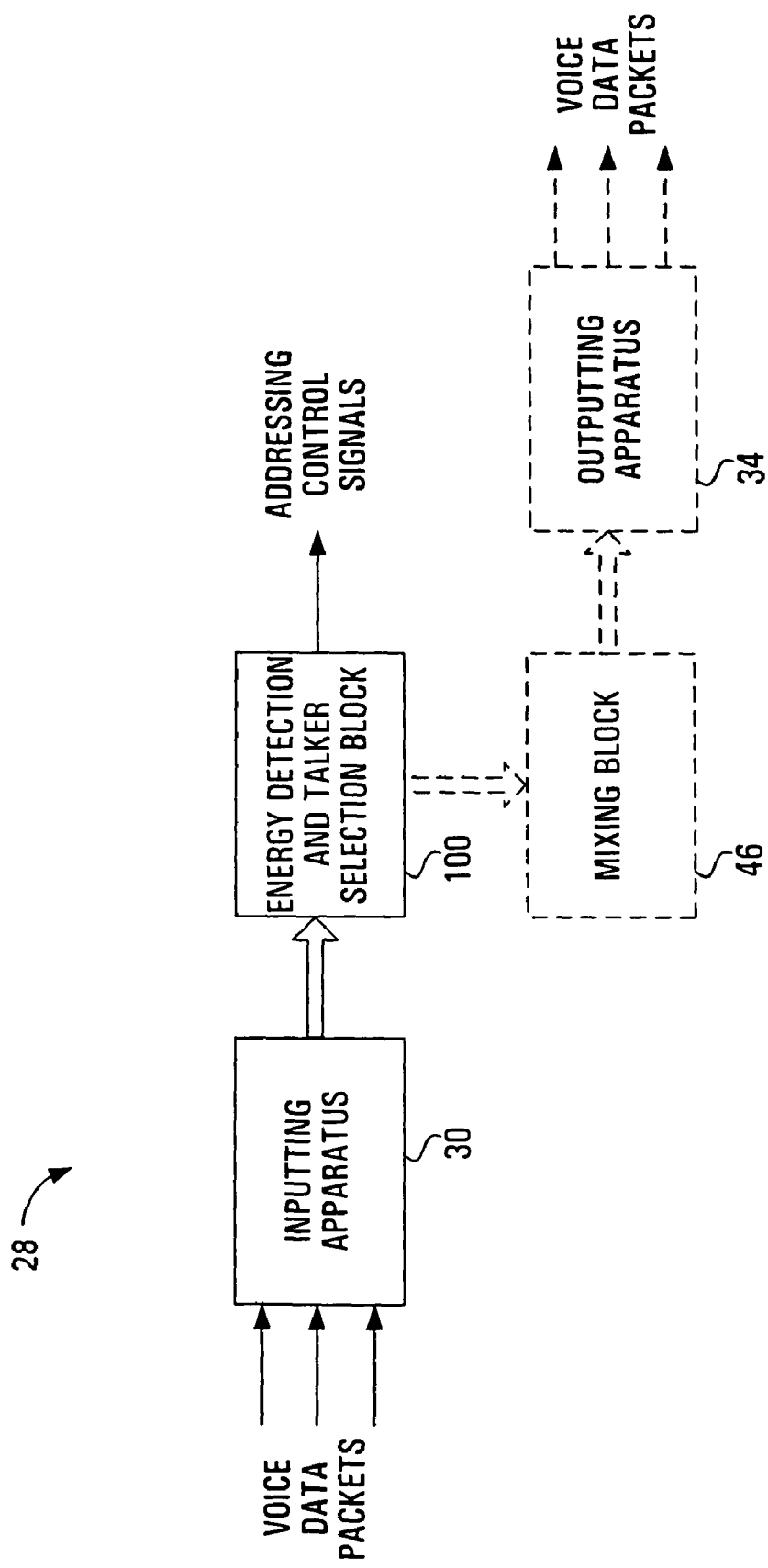
FIG. 7 is a logical block diagram illustrating a packet-based conference bridge according to a second embodiment of the present invention.

FIG. 7 is a logical block diagram illustrating a packet-based conference bridge according to a second embodiment of the present invention. This packet-based conference bridge replaces within FIG. 1B, the well-known packet-based conference bridge depicted within FIG. 2. As depicted in FIG. 7, the packet-based conference bridge 28 comprises the inputting apparatus 30 similar to that described above with reference to FIG. 2. The difference in the packet-based conference bridge 28 of FIG. 7 is the removal of the energy detection, talker selection and mixing block 32 and the outputting apparatus 34 and the insertion of energy detection and talker selection block 100 coupled to the inputting apparatus 30.

In operation, the energy detection and talker selection block 100 receives the voice signals corresponding to participants within a voice conference from the inputting apparatus 30, performs an energy detection operation on the received voice signals to determine which packet-based terminals within the voice conference have participants local to the terminals speaking, and selects the talker(s) within the voice conference based upon the results of the energy detection operation. Further, the block 100 within FIG. 7 operates to transmit addressing control signals to the packet-based terminals selected as talkers, the addressing control signals indicating the packet-based network addresses of the other packet-based terminals within the voice conference.

The energy detection operation performed within the energy detection and talker selection block 100 could be implemented in a number of different manners. For instance, it could include one of the speech detection algorithms described above for speech detector 66. As described previously, the operation of energy detection/speech detection algorithms are disclosed within U.S. patent application Ser. No. 09/475,047 as incorporated by reference previously. The talker selection operation performed within the block 100 could also be implemented in numerous different manners. Essentially, all of the possible implementations previously described for the talker selection block 44 of FIG. 4 could also apply to the talker selection operation within block 100. In some embodiment for instance, the talker selection operation selects primary and secondary talkers based upon the order in which participants began to speak.

As described above, the selection of the talkers within block 100 determines which packet-based terminals within the voice conference receive the addressing control signals, the addressing control signals giving the talkers permission to transmit their voice data packets to the other terminals within the voice conference. As well, the addressing control signals preferably forward the packet-based network addresses corresponding to the other packet-based terminals that is needed to transmit the voice data packets directly. In alternative implementations, the talker(s) do not require the packet-based network addresses since they have them stored internally. In this case, the addressing control signals are simply permission signals to allow the talkers to transmit to the other packet-based terminals within the voice conference.

As an option to the conference bridge according to the second embodiment of the present invention depicted in FIG. 7, the mixing block 46 and outputting apparatus 34 could be implemented in similar manner to that described above with reference to FIG. 4. In this case, the conference bridge 28 operates to mix and transmit the voice signals corresponding to the talkers prior to the talker(s) receiving permission to directly transmit their voice signals to the other packet-based terminals within the voice signal. These components 46,34 would operate in a similar manner as those described above for FIG. 4. As well, similar alternatives to those discussed above would be possible with components 46,34.

There are numerous alternative implementations for the packet-based conference bridge according to the second embodiment of the present invention. For one, similar to the first embodiment of the present invention, modifications within the conference bridge could be made similar to those described within U.S. patent application Ser. No. 09/475,047, previously incorporated by reference. As indicated within U.S. patent application Ser. No. 09/475,047, there are numerous implementations for the inputting apparatus 30 and energy detection and talker selection block 100 possible.

It should be noted that although the blocks 30,100,46,34 within FIG. 7 are depicted as separate components, these blocks are meant to be logical representations of algorithms which are hereinafter referred to collectively as conference processing logic. Similar to the first embodiment of the packet-based conference bridge, preferably, some or all of the conference processing logic is essentially software algorithms operating within a single control component such as a DSP. In alternative embodiments, some or all of the conference processing logic is comprised of hard logic and/or discrete components.

Figure 8:
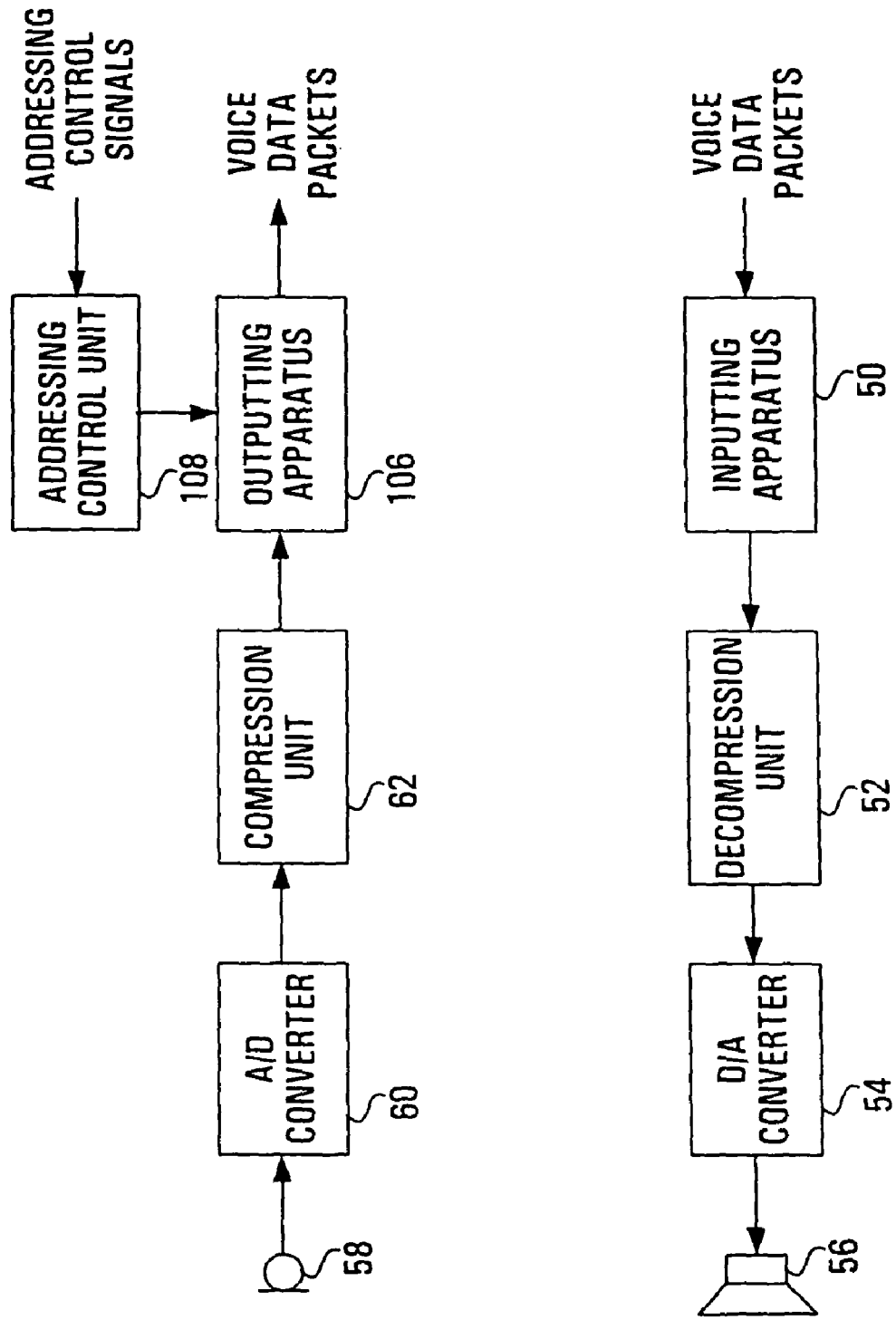
FIG. 8 is a logical block diagram illustrating a packet-based terminal according to the second embodiment of the present invention.

FIG. 8 is a logical block diagram illustrating a packet-based terminal according to the second embodiment of the present invention. In this embodiment, the packet-based terminal comprises the same components as described previously with reference to FIG. 5 but with the speech detector 66 removed, the outputting apparatus 64 replaced with outputting apparatus 106 and an addressing control unit 108 added.

In the operation of the packet-based terminal of FIG. 8, the outputting apparatus 106 transmits voice data signals corresponding to voice signals generated at the microphone 58 to the conference bridge 28. If the block 100 within the conference bridge 28 selects the particular packet-based terminal as a talker, the block 100 transmits an addressing control signal to the addressing control unit 108 within the terminal. This addressing control unit allows the packet-based terminal to transmit its voice data packets directly to the other terminals within the voice conference. The addressing control signals provide information needed to uniquely identify the other terminals that are to be transmitted to. In one particular example, the addressing control signal could include IP addresses and/or port addresses. As discussed above, alternatively, the packet-based terminal has these addresses stored internally. Subsequent to receiving an addressing control signal from the block 100 within the packet-based conference bridge 28, the addressing control unit 108 adjusts the outputting apparatus 106 such that the apparatus 106 further outputs its voice data packets to the packet-based terminals dictated by the conference bridge 28. In this operation, the outputting apparatus 106 continues to transmit its voice data packets to the conference bridge 28 as well so that the energy detection and talker selection block 100 can adjust the selection of talkers as necessary. If the packet-based terminal is deselected as a talker, a de-selection control signal is sent to the addressing control unit 108, the reception of the de-selection control signal resulting in the discontinuation of the direct transmitting of the voice data packets to the other terminals within the voice conference.

It should be recognized that modifications are required within the inputting apparatus 50 within the packet-based terminal for the second embodiment of the present invention if more than one talker is allowed to be selected at a time. This is because, according to the second embodiment of the present invention, this would result in more than one set of voice data packets arriving at the inputting apparatus 50. In the case of primary and secondary talkers being selected by the block 100, it is possible that a particular terminal will receive voice data packets from two different talkers. In this situation, the packet-based terminal mix the primary and secondary voice signals to generate mixed voice signals.

Figure 9:
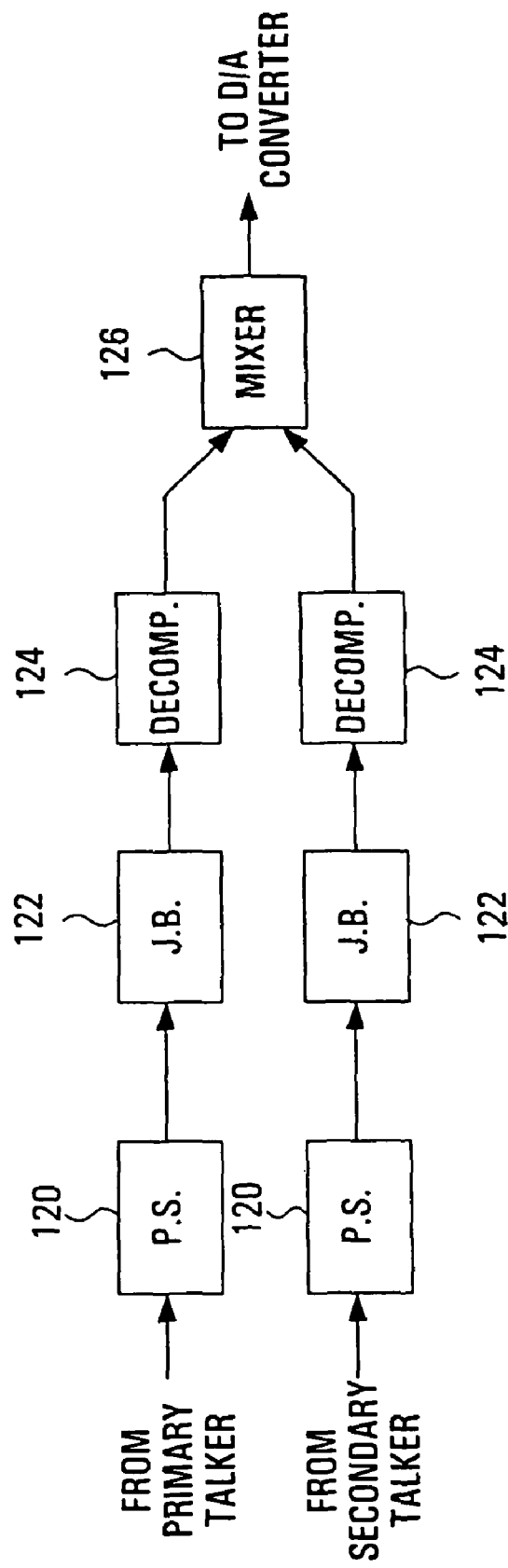
FIG. 9 is a functional block diagram illustrating the operations performed within the inputting apparatus and the decompression unit depicted within the packet-based terminal of FIG. 8.

FIG. 9 is a functional block diagram illustrating the modified operations performed within the inputting apparatus 50 and the decompression unit 52 for the situation that primary and secondary talkers are transmitting voice data packets to the packet-based terminal simultaneously. As depicted in FIG. 9, voice data packets from the primary and secondary talkers are input to respective protocol stacks 120 which are further coupled in series with respective jitter buffers 122 and decompression blocks 124. The decompressed outputs from the decompression blocks 124 are input to a mixer 126 that generates a mixed voice signal to be output to the D/A converter 54. In operation, the protocol stacks 120 remove the packet overhead from the received voice data packets and output voice signals in compressed format. The jitter buffers 122 operate to ensure that the voice signals are within the proper sequence (i.e. time ordering voice signals) and to buffer the voice signals to ensure smooth playback. The decompression blocks 124 decompress the voice signals such that they are preferably in PCM format and the mixer 126 operates to mix the decompressed voice signals together using well-known techniques.

Although depicted as separate components within FIG. 9, the pair of protocol stacks 120, the pair of jitter buffers 122 and the pair of decompression blocks 124 preferably comprise a single protocol stack software algorithm, a single jitter buffer software algorithm and a single decompression software algorithm respectively, each of which capable of being run for each received packet. In this implementation, the software algorithms are possibly run in parallel as more than one voice data packet can be received at one time. It is noted that U.S. patent application Ser. No. 09/475,047, incorporated by reference previously, discloses a packet-based terminal with an inputting apparatus similar to that described above with reference to FIG. 9.

Although the blocks within FIG. 8 are depicted as separate components, similar to the packet-based terminal of FIG. 5, these blocks are meant to be logical representations of algorithms which are hereinafter referred to collectively as media signal processing logic. Preferably, some or all of the media signal processing logic is essentially software algorithms operating within a single control component such as a DSP. In alternative embodiments, some or all of the media signal processing logic is comprised of hard logic and/or discrete components.

There are a number of advantages of the packet-based network according to the second embodiment of the present invention. With the direct transmission of voice data packets from one packet-based terminal to other packet-based terminals, there is a significantly lighter load on the conference bridge which translates into higher capacity. Further, the conferencing configuration of the second embodiment reduces the concentration effect in which conference bridges are traditionally significant sources and sinks of traffic within the network and redistributes the traffic more evenly within the packet-based network. Yet further, the direct transmission of the voice data packets can reduce the need for transcoding and also decrease the overall latency.

Figure 10:
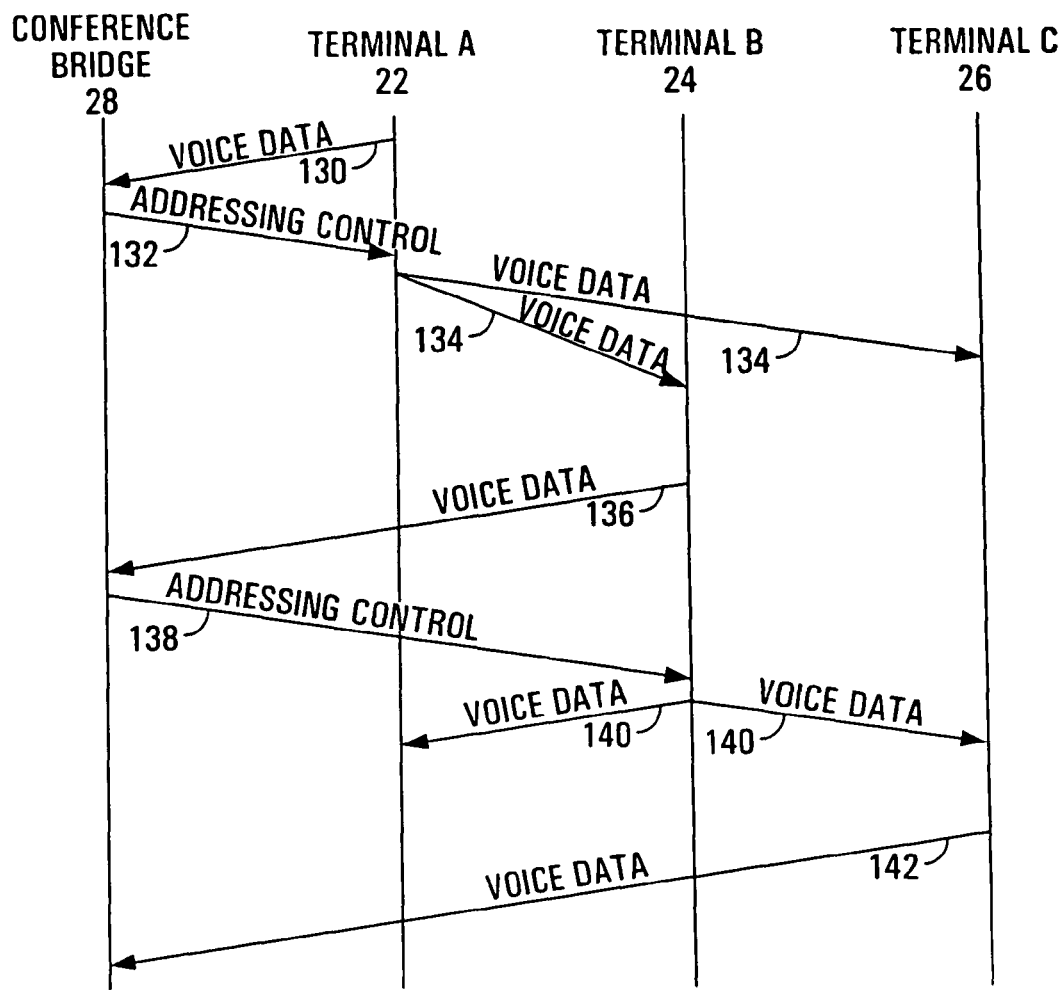
FIG. 10 is a signalling diagram illustrating a sample operation of a packet-based network according to the second embodiment of the present invention.

FIG. 10 is a signalling diagram illustrating a sample operation of a packet-based network according to the second embodiment of the present invention. Within FIG. 10, a voice conference is being initiated between packet-based terminals A,B,C 22,24,26 using conference bridge 28. In this case, the conference bridge 28 is designed as described herein above with reference to FIG. 7 while each of the packet-based terminals 22,24,26 are designed as described herein above with reference to FIG. 8. The talker selection algorithm within this example includes the selection of primary and secondary talkers based upon the order in which participants begin to speak.

As depicted within FIG. 10, initially within the signalling diagram, terminal A 22 transmits voice data packets 130 to the conference bridge 28. These voice data packets 130 are processed within the conference bridge 28 and, in this sample operation, terminal A 22 is selected as the primary talker (and lone talker) since the voice data packets 130 contain speech. In response to this talker selection, the conference bridge 28 sends an addressing control signal 132 to the terminal A 22, this addressing control signal 132 instructing the terminal A 22 to transmit its voice data packets directly to terminals B,C 24,26. As depicted in FIG. 10, the terminal A 22 subsequently starts transmitting voice data packets 134 to the terminals B,C 24,26. Although not illustrated in FIG. 10, the transmitting of voice data packets from terminal A 22 to both the conference bridge 28 and the other terminals B,C 24,26 within the voice conference would continue until the conference bridge 28 instructed the terminal A 22 to stop, presumably due to the terminal A 22 being deselected as a talker.

Next, within FIG. 10, voice data packets 136 are transmitted from terminal B 24 to the conference bridge 28. These voice data packets 136, in the situation being depicted in FIG. 10, result in the conference bridge 28 selecting the terminal B 24 as the secondary talker since the voice data packets 136 contain speech. In response to the talker selection, the conference bridge 28 instructs the terminal B 24 to transmit its voice data packets directly to the terminals A,C 22,26 with the use of an addressing control signal 138. Once this addressing control signal 138 is received at the terminal B 24, the terminal B 24 proceeds to transmit its voice data packets 140 to the other terminals A,C 22,26 within the voice conference (along with continuing to transmit the voice data packets to the conference bridge 28 for analysis). In this situation, terminal C 26 receives voice data packets from both terminals A and B 22,24 and a mixing operation would be required.

As depicted in FIG. 10, terminal C 26 subsequently begins to transmit voice data packets 142 to the conference bridge 28. Assuming that the voice data packets being transmitted to the conference bridge 28 from the terminals A,B 22,24 still are deemed to contain speech, in this particular situation the terminal C 26 is not selected as a talker no matter if the voice data packets 142 contain speech or not.

A third embodiment of the present invention, in which the first and second embodiments of the present invention are combined, is now described with reference to FIGS. 11, 12 and 13. In this embodiment, speech indication signals are sent from the packet-based terminals within the voice conference to the packet-based conference bridge 28 and addressing control signals are sent from the conference bridge 28 to the packet-based terminals that are selected as talkers. This allows the packet-based network of the third embodiment of the present invention to gain the advantages of both the first and second embodiments described above.

Figure 11:
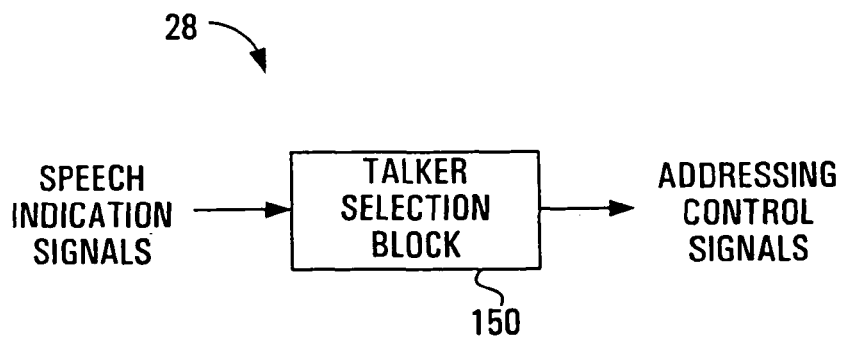
FIG. 11 is a logical block diagram illustrating a packet-based conference bridge according to a third embodiment of the present invention.

In this third embodiment of the present invention, the packet-based conference bridge 28 is reduced to simply a talker selection block 150 as illustrated in FIG. 11. The talker selection block 150 operates in similar fashion to talker selection block 44 in terms of selecting talkers based upon the received speech indication signals while the block 150 operates in similar fashion to block 100 in terms of sending addressing control signals based upon the selection of the talker(s). The talker selection block 150 could be implemented in numerous manners similar to the blocks 44,100 described above with reference to FIGS. 4 and 7 respectively.

Figure 12:
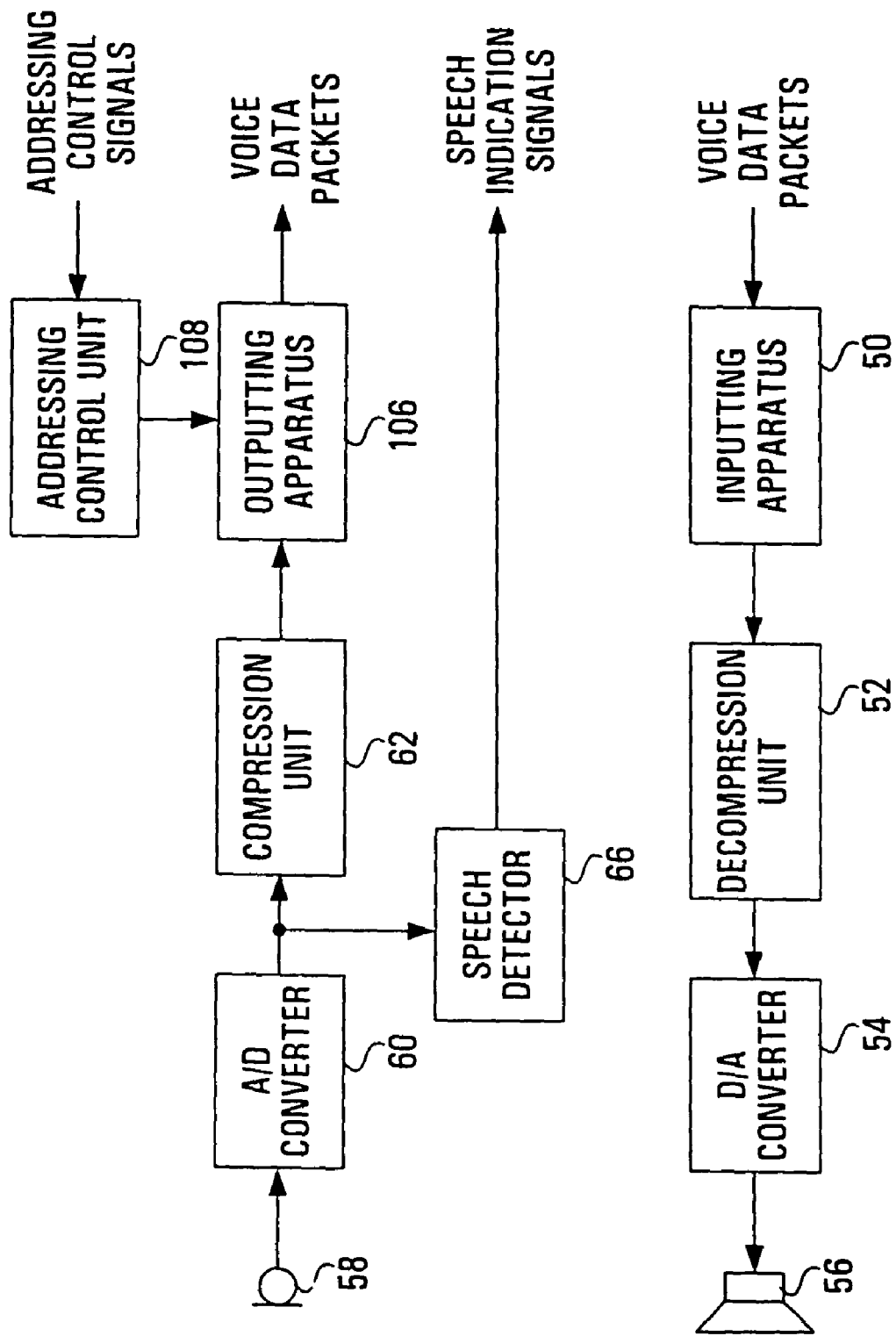
FIG. 12 is a logical block diagram illustrating a packet-based terminal according to the third embodiment of the present invention.

FIG. 12 is a logical block diagram illustrating a packet-based terminal according to the third embodiment of the present invention. As depicted within FIG. 12, the packet-based terminal comprises similar components to the packet-based terminal described above with reference to FIG. 8 but additionally comprising the speech detector 66 previously described for the first embodiment of the terminal with reference to FIG. 5. Alternatives similar to those described above for the packet-based terminals of FIGS. 5 and 8 are also possible for the packet-based terminal according to the third embodiment of the present invention depicted in FIG. 12.

Figure 13:
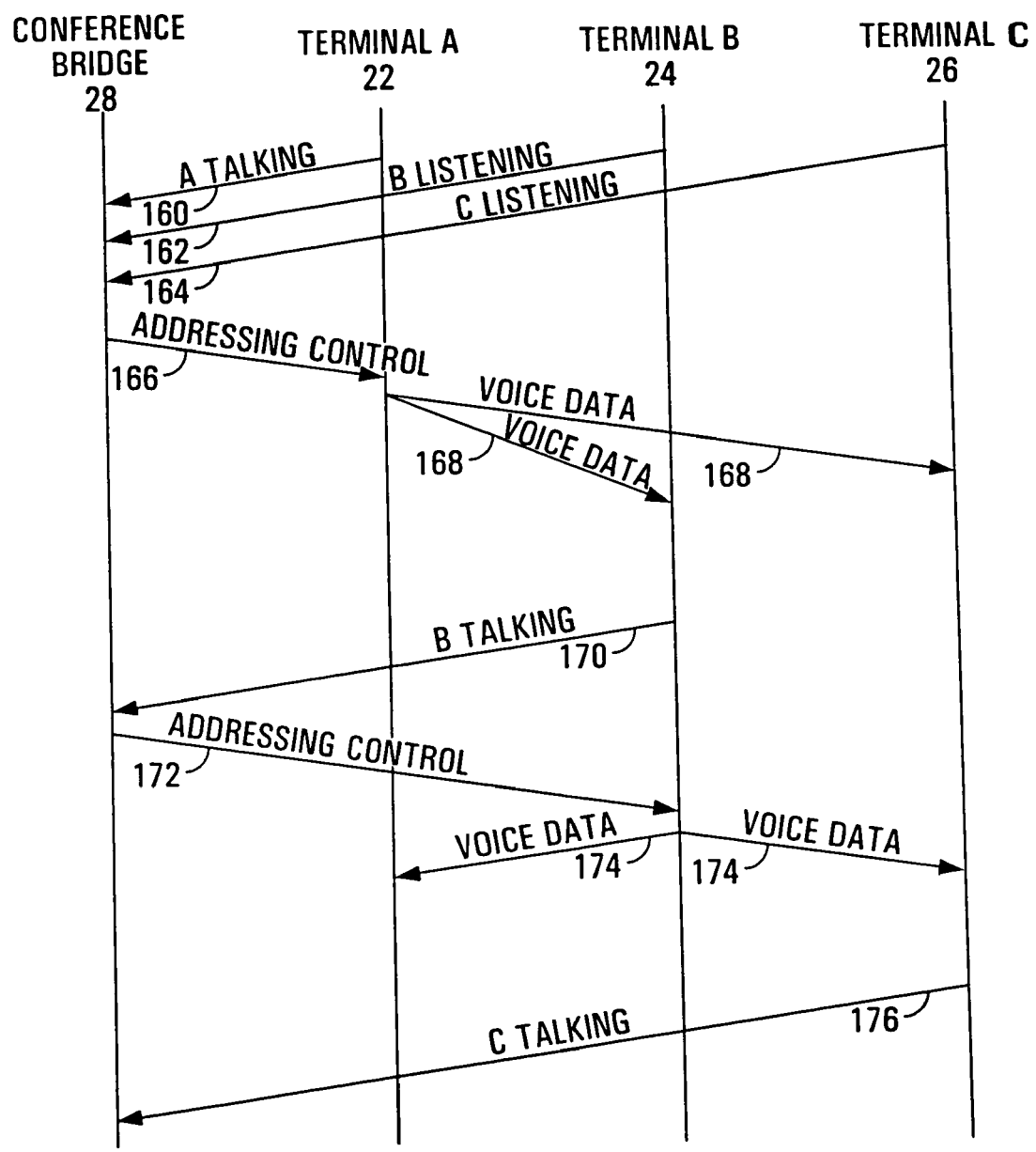
FIG. 13 is a signalling diagram illustrating a sample operation of a packet-based network according to the third embodiment of the present invention.

FIG. 13 is a signalling diagram illustrating a sample operation of a packet-based network according to the third embodiment of the present invention. Within FIG. 13, a voice conference is being initiated between packet-based terminals A,B,C 22,24,26 using conference bridge 28. In this case, the conference bridge 28 is designed as described herein above with reference to FIG. 11 while each of the packet-based terminals 22,24,26 are designed as described herein above with reference to FIG. 12. The talker selection algorithm within this example includes the selection of primary and secondary talkers based upon the order in which participants begin to speak.

As depicted within FIG. 13, initially within the signalling diagram, terminals B,C 24,26 transmit listening signals 162, 164 to the conference bridge 28, these listening signals 162, 164 indicating that no participant within the voice conference local to the terminals 24,26 is speaking. Terminal A 22 is transmitting a talking signal 160 to the conference bridge 28 which indicates that a participant local to the terminal 22 is speaking. At this point, the conference bridge 28 selects the terminal A 22 as the primary talker and an addressing control signal 166 is transmitted to terminal A 22. This addressing control signal 166 instructs the terminal A 22 to transmit its voice data packets 168 to the other terminals B,C 24,26 within the voice conference.

Next within FIG. 13, the terminal B 24 transmits a talking signal 170 to the conference bridge 28, this talking signal indicating that a participant within the voice conference which is local to terminal 24 is speaking. At this point, the conference bridge 28 selects the terminal B 24 as the secondary talker and transmits an addressing control signal 172 to the terminal B 24. Once the addressing control signal 172 is received at the terminal B 24, the terminal proceeds to transmit its voice data packets 174 to the other terminals A,C 22,26 within the voice conference. In this situation, terminal C 26 receives voice data packets from both terminals A and B 22,24 and a mixing operation would be required.

As depicted in FIG. 13, terminal C 26 subsequently transmits a talking signal 176 to the conference bridge 28, this talking signal 176 indicating that a participant within the voice conference local to terminal C 26 has begun to speak. In this case, since primary and secondary talkers are already selected and in this particular example only two talkers are to be selected at a time, an addressing control signal is not sent to the terminal C 26 and no permission is given for terminal C 26 to transmit its voice data packets to the other terminals A,B 22,24. Essentially, the participant at the terminal C 26 is being muted within the voice conference.

The packet-based terminals for embodiments as described herein above is not specific to any one packet-based voice communications standard (such as VoIP G.711, G.729, G.723, etc), as it can be modified such that it can be used for numerous different standards. In one alternative embodiment, the packet-based terminal is a multi-mode terminal that allows for voice conferences of a number of different standards to utilize the single packet-based terminal.

It should be noted that, although the network described above for embodiments of the present invention was specific to networks used for voice conferencing, this should not limit the scope of the present invention. For instance, the network of packet-based terminals could be used for point-to-point communications as well as voice conferencing. In the case of a point-to-point voice communication, both terminals would select the other participant as a lone talker. This allows a point-to-point conversation to be expanded to a larger voice conference with no major configuration modifications.

In general, although the operation of the present invention was described herein above with use of the terms voice data packets and voice signals, these packets and signals can be referred to broadly as media data packets and media signals respectively. In this case, media data packets are any data packets that are transmitted via the media plane, these media data packets preferably being either audio or audio/video data packets. It is noted that use of the term voice data packets above is specific to the described embodiments in which the audio signals are voice. Further, it should be understood that video data packets may incorporate audio data packets.

Although the present invention herein above described has a single voice conference being established with the use of a network of packet-based apparatus and a conference bridge, it should be understood that in some embodiments the conference bridge it could be possible and/or one or more of the packet-based apparatus could be capable of handling a plurality of voice conferences simultaneously.

Persons skilled in the art will appreciate that there are yet more alternative implementations and modifications possible for implementing the present invention, and that the above implementation is only an illustration of this embodiment of the invention. The scope of the invention, therefore, is only to be limited by the claims appended hereto.

We claim:

1. A conference bridge comprising:
   an input unit that operates to receive media data packets from at least two sources forming a media conference, each media data packet comprising a media signal and packet overhead, wherein the input unit is adapted to remove the packet overhead;
   a talker selection unit that operates to receive speech indication signals from at least one of the sources within the media conference and to process the speech indication signals including selecting a set of the sources within the media conference as talkers; and
   an output unit, coupled to the input unit, that operates to output the media signals that correspond to the set of sources within the media conference selected as talkers.

2. A conference bridge according to claim 1, wherein each of the speech indication signals comprises one of a talking indication and a listening indication corresponding to the respective source within the media conference.

3. A conference bridge according to claim 2, wherein to select a set of the sources within the media conference as talkers, the talker selection unit operates to:
   monitor the speech indication signals for talking indications; and
   select sources within the media conference as talkers based upon the order in which any talking indications are received at the talker selection unit from the sources within the media conference.

4. A conference bridge according to claim 1, wherein each of the speech indication signals comprises at least one speech parameter corresponding to the respective source within the media conference.

5. A conference bridge according to claim 4, wherein to select a set of the sources within the media conference as talkers, the talker selection unit operates to:
   determine which sources within the media conference are sending media signals containing speech with the use of the speech parameters within the speech indication signals; and
   select sources within the media conference as talkers based upon the order in which sources within the media conference are determined to send media signals containing speech.

6. A conference bridge according to claim 4, wherein the speech parameter within each of the speech indication signals is an energy level corresponding to media signals sent from the respective source within the media conference.

7. A conference bridge according to claim 6, wherein to select a set of the sources within the media conference as talkers, the talker selection unit operates to:
   determine which sources within the media conference are sending media signals containing speech with the use of the energy levels within the speech indication signals; and
   select sources within the media conference as talkers based upon the comparative energy levels of the sources within the media conference determined to be sending media signals containing speech.

8. A conference bridge according to claim 4, wherein the speech parameter within each of the speech indication signals is a pitch value corresponding to media signals sent from the respective source within the media conference.

9. A conference bridge according to claim 4, wherein the speech parameter within each of the speech indication signals is a number of bytes within media signals sent from the respective source within the media conference.

10. A conference bridge according to claim 1, wherein the set of the sources within the media conference selected as talkers comprises a plurality of sources within the media conference; and
    wherein the conference bridge further comprises a mixing block, coupled between the input and output units, that operates to receive media signals corresponding to sources within the media conference selected as talkers from the input unit, mix these received media signals and output the mixed result to the output block.

11. A conference bridge according to claim 1, wherein the set of the sources within the media conference selected as talkers comprises a lone source within the media conference.

12. A conference bridge according to claim 1, wherein the media data packets are audio data packets and the media signals defined by the media data packets are audio signals.

13. A conference bridge according to claim 1, wherein the media data packets are audio/video data packets and the media signals defined by the media data packets are audio/video signals.

14. A conference bridge comprising:
    means for receiving media data packets from at least two sources forming a media conference, each media data packet comprising a media signal and packet overhead, wherein the input unit is adapted to remove the packet overhead;
    means for receiving speech indication signals from at least one of the sources within the media conference;
    means for processing the speech indication signals including selecting a set of the sources within the media conference as talkers; and
    means for outputting the media signals that correspond to the set of sources within the media conference selected as talkers.

15. A conference bridge comprising:
    means for receiving media data packets from at least two sources forming a media conference, each media data packet defining a media signal;

means for selecting a set of the sources within the media conference as talkers; and means for instructing the sources within the media conference selected as talkers to output their media signals directly to other sources within the media conference.

16. A conference bridge arranged to be coupled to a packet-based network that includes at least two sources of media signals forming a media conference, the conference bridge comprising:
means for receiving speech indication signals from at least one of the sources within the media conference;
means for processing the speech indication signals including selecting a set of the sources within the media conference as talkers; and
means for instructing the sources within the media conference selected as talkers to output their media signals directly to other sources within the media conference.

17. A packet-based apparatus arranged to be coupled to a conference bridge via a packet-based network, the packet-based apparatus comprising:
an addressing control unit that operates to receive at least one addressing control signal from the conference bridge; and
an output unit that operates to receive media signals from at least one participant within a media conference and output the received media signal, via the packet-based network, to at least one other participant within the media conference based upon the addressing control signal.

18. A packet-based apparatus according to claim 17, wherein the addressing control signal comprises a packet-based network address corresponding to the at least one other participant within the media conference.

19. A packet-based apparatus according to claim 17, wherein the output unit comprises a microphone that operates to receive audio signals from the at least one participant within the media conference, the received media signal comprising audio signals received from the microphone.

20. A packet-based network interface arranged to be coupled between a packet-based network and a non-packet-based network, the network interface comprising a packet-based apparatus according to claim 17, wherein the output unit receives the media signal from the at least one participant within the media conference from a non-packet-based telephone terminal via the non-packet-based apparatus.

21. A packet-based apparatus according to claim 17 further comprising a speech detection unit, coupled to the output unit, that operates to process the received media signal, generate a speech indication signal based upon the received media signal, and output the speech indication signal to the conference bridge.

22. A packet-based apparatus according to claim 21, wherein to generate a speech indication signal based upon the received media signal, the speech detection unit operates to:
determine a speech parameter corresponding to the received media signal; and
include the speech parameter within the speech indication signal.

23. A packet-based apparatus according to claim 22, wherein to determine a speech parameter corresponding to the received media signal, the speech detection unit determines an energy level corresponding to the received media signal.

24. A packet-based apparatus according to claim 22, wherein to determine a speech parameter corresponding to the received media signal, the speech detection unit determines a pitch value corresponding to the received media signal.

25. A packet-based apparatus according to claim 22, wherein the output unit further operates to compress the received media signal prior to outputting the compressed media signal to the conference bridge; and wherein to determine a speech parameter corresponding to the received media signal, the speech detection unit determines the number of bytes of the compressed media signal.

26. A method for controlling a media conference, the method comprising:
receiving media data packets from at least two sources forming a media conference, each media data packet comprising a media signal and packet overhead;
removing the packet overhead from the media data packets;
receiving speech indication signals from at least one of the sources within the media conference;
selecting a set of the sources within the media conference as talkers based on the received speech indication signals; and
outputting the media signals that correspond to the set of sources within the media conference selected as talkers.

27. A method for controlling a media conference including at least two sources of media signals, the method comprising:
selecting a set of the sources of media signals within the media conference as talkers, wherein selecting the set of sources involves identifying the sources within the media conference containing speech and selecting a set of the sources containing speech as talkers; and
instructing the sources within the media conference selected as talkers to output their media signals directly to other sources within the media conference.

28. A method according to claim 27, wherein the selecting a set of the sources of media signals within the media conference as talkers comprises:
receiving media signals from the sources within the media conference;
determining at least one speech parameter corresponding to each of the received media signals; and
selecting a set of the sources within the media conference as talkers based on the determined speech parameters.

29. A method according to claim 27, wherein the selecting a set of the sources of media signals within the media conference as talkers comprises:
receiving speech indication signals from at least one of the sources within the media conference; and
selecting a set of the sources within the media conference as talkers based on the received speech indication signals.

30. A method for a packet-based apparatus to operate within a media conference controlled by a conference bridge, the method comprising:
receiving media signals from at least one participant within the media conference;
receiving at least one addressing control signal from the conference bridge; and
outputting the received media signal to at least one other participant within the media conference based upon the addressing control signal.

31. A method according to claim 30 further comprising:
processing the received media signal in order to generate a speech indication signal based upon the received media signal; and
outputting the speech indication signal to the conference bridge.

32. A network incorporating a conference bridge according to claim 1 and further comprising a plurality of sources of media signals within the media conference;
wherein each of the sources within the media conference operates to output the at least one media signal to the conference bridge along with a speech indication signal corresponding to the at least one media signal.

* * * * *